US012211170B2

(12) United States Patent
Demarco et al.

(10) Patent No.: US 12,211,170 B2
(45) Date of Patent: *Jan. 28, 2025

(54) WORKPLACE DIGITAL BILLBOARD EXPERIENCE

(71) Applicant: Wells Fargo Bank N.A., San Francisco, CA (US)

(72) Inventors: William R. Demarco, Waxhaw, NC (US); Charles K. Lampe, Charlotte, NC (US); Michelle N. Lindgren, New York, NY (US); Ryann M. Neal, Charlotte, NC (US)

(73) Assignee: Wells Fargo Bank N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,201

(22) Filed: Jul. 27, 2023

(65) Prior Publication Data

US 2023/0368331 A1 Nov. 16, 2023

Related U.S. Application Data

(63) Continuation of application No. 16/986,052, filed on Aug. 5, 2020, now Pat. No. 11,727,532.

(Continued)

(51) Int. Cl.
*G06F 3/04847* (2022.01)
*G06F 3/04815* (2022.01)
(Continued)

(52) U.S. Cl.
CPC ............ *G06T 3/18* (2024.01); *G06F 3/04815* (2013.01); *G06F 3/0482* (2013.01); *G06F 3/14* (2013.01);
(Continued)

(58) Field of Classification Search
CPC .......... G06Q 30/0261; G06Q 30/0267; G06Q 30/0271; G06Q 30/0241; G06Q 30/0276;
(Continued)

(56) References Cited

U.S. PATENT DOCUMENTS 5,175,812 A * 12/1992 Krieger ................... G06F 9/453
715/708
5,682,469 A 10/1997 Linnett et al.
(Continued)

OTHER PUBLICATIONS

Anonymous. 31 Brilliant User Interface Animations. Web entry at DigitalSynopsis.com. Available to the public on Jun. 8, 2017. Retrieved from [https://digitalsynopsis.com/design/ui-ux-animation-inspiration/] on [Nov. 29, 2021]. 40 pages (Year: 2017).

(Continued)

*Primary Examiner* — Rayeez R Chowdhury
(74) *Attorney, Agent, or Firm* — Foley & Lardner LLP

(57) ABSTRACT

A system includes one or more processors and one or more computer-readable storage mediums storing instructions that cause the one or more processors to receive a content package including a plurality of menu items, a concierge item, and a plurality of content items, display the concierge item and the menu items within a first region of a screen of a billboard computing device, display a first content item within a second region of the screen, detect an interaction with a menu item, morph the concierge item from a first format to a second format, and display a message within the second region based on the interaction with the menu item, where the billboard computing device displays the concierge item of the first display format as a static object and displays the concierge item of the second display format as an animated object.

20 Claims, 25 Drawing Sheets

Related U.S. Application Data

(60) Provisional application No. 62/929,912, filed on Nov. 3, 2019.

(51) Int. Cl.

| | | |
|---|---|---|
| *G06F 3/0482* | (2013.01) | |
| *G06F 3/14* | (2006.01) | |
| *G06F 16/955* | (2019.01) | |
| *G06Q 90/00* | (2006.01) | |
| *G06T 3/18* | (2024.01) | |
| *G06T 11/60* | (2006.01) | |
| *G06T 13/80* | (2011.01) | |
| *G06T 17/00* | (2006.01) | |
| *G09F 9/00* | (2006.01) | |

(52) U.S. Cl.
CPC ............ *G06F 16/955* (2019.01); *G06Q 90/20* (2013.01); *G06T 11/60* (2013.01); *G06T 13/80* (2013.01); *G06T 17/00* (2013.01); *G09F 9/00* (2013.01); *G06F 2203/04803* (2013.01); *G06T 2200/24* (2013.01)

(58) Field of Classification Search
CPC ......... G06Q 50/01; G06Q 10/00; G06Q 30/02; G06Q 30/0244; G06Q 30/0247; G06Q 30/0252; G06Q 30/0254; G06Q 30/0264; G06Q 30/0273; G06Q 30/0277; G06F 15/17306; G06F 16/93; G06F 16/9535; H04L 51/52; H04L 67/306; H04L 65/40

See application file for complete search history.

(56) References Cited

U.S. PATENT DOCUMENTS

| | | | |
|---|---|---|---|
| 5,761,071 | A | 6/1998 | Bernstein et al. |
| 6,460,040 | B1 | 10/2002 | Burns |
| 7,113,088 | B2 | 9/2006 | Frick et al. |
| 7,603,621 | B2 | 10/2009 | Toyama et al. |
| 7,730,401 | B2 | 6/2010 | Gillespie et al. |
| 8,139,751 | B1 | 3/2012 | Magsamen et al. |
| 8,504,925 | B1 | 8/2013 | Haase |
| 8,688,664 | B2 | 4/2014 | Pineau et al. |
| 8,777,737 | B2 | 7/2014 | Lemay |
| 8,830,291 | B2 | 9/2014 | Kay et al. |
| 10,481,760 | B2 | 11/2019 | Rolih |
| 2002/0078459 | A1* | 6/2002 | Mckay .................... G09F 27/00 348/E7.087 |
| 2002/0098001 | A1 | 7/2002 | Dahl |
| 2002/0118220 | A1 | 8/2002 | Lui et al. |
| 2003/0046166 | A1 | 3/2003 | Liebman |
| 2003/0067466 | A1 | 4/2003 | Stephany et al. |
| 2004/0059591 | A1 | 3/2004 | Greve |
| 2005/0154736 | A1 | 7/2005 | Meikleham et al. |
| 2006/0048070 | A1 | 3/2006 | Taylor et al. |
| 2007/0206001 | A1 | 9/2007 | McKay |
| 2007/0243936 | A1 | 10/2007 | Binenstock et al. |
| 2008/0048973 | A1 | 2/2008 | McKay |
| 2009/0144143 | A1 | 6/2009 | Iyer |
| 2010/0021013 | A1 | 1/2010 | Gale et al. |
| 2010/0131502 | A1 | 5/2010 | Fordham |
| 2010/0211489 | A1 | 8/2010 | Zhang et al. |
| 2011/0173549 | A1 | 7/2011 | Hipskind |
| 2011/0222784 | A1* | 9/2011 | Rowe ....................... G06F 3/048 345/173 |
| 2011/0294564 | A1 | 12/2011 | Michelstein et al. |
| 2013/0090958 | A1 | 4/2013 | Chin et al. |
| 2013/0157609 | A1 | 6/2013 | Vainik et al. |
| 2013/0167025 | A1 | 6/2013 | Patri et al. |
| 2015/0301729 | A1 | 10/2015 | Wang et al. |
| 2015/0356526 | A1 | 12/2015 | Christmas |
| 2015/0356912 | A1 | 12/2015 | Dietz |
| 2015/0370444 | A1* | 12/2015 | Jitkoff ................... G06T 11/001 715/823 |
| 2016/0037236 | A1* | 2/2016 | Newell .............. H04N 21/8153 725/32 |
| 2017/0249714 | A1 | 8/2017 | Van Hoof et al. |
| 2017/0265046 | A1 | 9/2017 | Chen et al. |
| 2017/0277274 | A1 | 9/2017 | Boblett |
| 2018/0091568 | A1 | 3/2018 | Edgington, Jr. |
| 2019/0097824 | A1 | 3/2019 | Barr et al. |
| 2019/0107991 | A1 | 4/2019 | Spivack et al. |
| 2020/0090216 | A1* | 3/2020 | Gudai ................. G06F 16/9535 |

OTHER PUBLICATIONS

Babich, Nick. How Functional Animation Helps Improve User Experience . Web article posted Jan. 11, 2017 at Smashing Magazine. Retrieved from [https://www.smashingmagazine.com/2017/01/how-functional-animation-helps-improve-user-experience] on [Dec. 2, 2021]. 18 pages (Year: 2017).

Gadd. UI cheat sheet: buttons, Internet article posted at UX Collective on May 12, 2019. Retrieved from [https://usdesign.cc/ui-cheat-sheets-buttons-7329ed96112] on [Dec. 1, 2021]. 17pages (Year: 2019).

Horton, Tyler Bruce. SKINNI: The Smart Kiosk Information Navigation and Note-posting Interface. Master's Thesis for Electrical Engineering at Massachusetts Institute of Technology. Aug. 2004. 91 pages. (Year: 2004).

McCracken, Harry. The Bob Chronicles. Web article posted at Technologizer on Mar. 29, 2010. Retrieved from [https://www.technologizer.com/2010/03/29/microsoft-bob/] on [Nov. 29, 2021]. 47 pages. (Year: 2010).

McCracken, Harry. The Secret Origins of Clippy: Microsoft's Bizarre Animated Character Patents. Web Article posted at Technologizer on Jan. 2, 2009. Retrieved from [https://www.technologizer.com/2009/01/02/microsoft-clippy-patents/] on [Nov. 29, 2021]. 30 pages. (Year: 2009).

Trower, Tandy. Bob and Beyond: A Microsoft Insider Remembers. Web Article posted at Technologizer on Mar. 29, 2010. Retrieved from [https://www.technologizer.com/2010/03/29/bob-and-beyond-a-microsoft-insider-remembers/] on [Nov. 29, 2021]. 11 pages. (Year: 2010).

Williams, Harel. DomeView: Community-based Digital Bulletin Boards and Mobile Phone Interactions. Master's Thesis for Electrical Engineering at Massachusetts Institute of Technology, May 2007. 61 pages. (Year: 2007).

* cited by examiner

WORKPLACE DIGITAL BILLBOARD EXPERIENCE

CROSS-REFERENCE TO RELATED APPLICATIONS

This application is a continuation of U.S. patent application Ser. No. 16/986,052, filed Aug. 5, 2020, which claims the benefit of and priority to U.S. Provisional Patent Application No. 62/929,912, filed Nov. 3, 2019, each of which are incorporated herein by reference in their entirety and for all purposes.

BACKGROUND

A lobby directory provides customers of a business with a map or information about the business to help the customer find their way through the building without having to approach the front desk. A lobby directory may be particular fitting for hotels, commercial real estate, medical buildings, and school campuses.

SUMMARY

Aspects of the present disclosure relate generally to a billboard computing device, and more particularly to systems and methods for providing interactive guidance to a user via a billboard computing device for navigating a workplace.

One arrangement disclosed herein is directed to a method for providing interactive guidance to a user via a billboard computing device for navigating a workplace. In some arrangements, the method includes receiving, by a billboard computing device over a network and from a management server, a content package generated based on data associated with an organization, the content package including a plurality of menu items, a concierge item, and a plurality of content items. In some arrangements, the method includes displaying, by the billboard computing device and based on the content package, the concierge item and the plurality of menu items within a first region of a screen. In some arrangements, the method includes displaying, by the billboard computing device and based on the content package, a first content item of the plurality of content items within a second region of the screen. In some arrangements, the method includes detecting, by the billboard computing device and based on the content package, an interaction with the concierge item displayed on the screen. In some arrangements, the method includes morphing, by the billboard computing device responsive to detecting the interaction with the concierge item and based on the content package, the concierge item from a first display format to a second display format different from the first display format.

In some arrangements, the billboard computing device displays the concierge item of the first display format on the screen as one of a two-dimensional object and a three-dimensional object, wherein the billboard computing device displays the concierge item of the second display format on the screen as the other of the two-dimensional object and the three-dimensional object.

In some arrangements, the billboard computing device displays the concierge item of the first display format on the screen at a first position relative to the plurality of menu items, wherein the billboard computing device displays the concierge item of the second display format on the screen in a second position different from the first position.

In some arrangements, the billboard computing device displays the concierge item of the second display format by animating the concierge item of the second display format to display at least one of a flipping movement, a twisting movement, a bouncing movement, and a rolling movement.

In some arrangements, the method may include displaying, by the billboard computing device, a textual message within the second region of the screen, wherein the textual message provides guidance to interact with one or more of the plurality of menu items.

In some arrangements, the method includes detecting, by the billboard computing device, an interaction with a menu item of the plurality of menu items. In some arrangements, the method includes morphing, by the billboard computing device responsive to detecting the interaction with the menu item, the concierge item from the first display format to the second display format different from the first display format based on the content package.

In some arrangements, the method includes displaying, by the billboard computing device, a textual message within the second region of the screen, wherein the textual message provides guidance to interact with the menu item of the plurality of menu items, and the textual message is not associated with another menu item of the plurality of menu items.

In some arrangements, the method includes detecting, by the billboard computing device, an occurrence of a triggering event. In some arrangements, the method includes responsive to detecting the occurrence of the triggering event: removing, by the billboard computing device, the textual message from the screen, and morphing, by the billboard computing device, the concierge item from the second display format to the first display format.

In some arrangements, the method includes maintaining, by the billboard computing device and in a database, a plurality of associations between a plurality of historical textual messages and a plurality of historical display formats, each association of the plurality of associations corresponding to a historical textual message of the plurality of historical textual messages and a historical display format of the plurality of historical display formats used to display the concierge item, wherein each of the plurality of historical textual messages were previously displayed on the screen and removed from the screen.

In some arrangements, the method includes receiving, by the billboard computing device, a request to re-display one of the historical textual messages of the plurality of historical textual messages. In some arrangements, the method includes retrieving, by the billboard computing device responsive to the request, and from the database, the historical textual message and the historical display format associated with the historical textual message. In some arrangements, the method includes morphing, by the billboard computing device, the concierge item from the second display format to the historical display format. In some arrangements, the method includes displaying, by the billboard computing device, the historical textual message within the second region of the screen.

In some arrangements, the method includes selecting, by the billboard computing device and based on information associated with a building, the first content item from the plurality of content items for display within the second region of the screen, the billboard computing device being geographically proximate to the building. In some arrangements, the method includes determining, by the billboard computing device, an expiration of a predetermined period of time since displaying the first content item within the second region of the screen. In some arrangements, the method includes selecting, by the billboard computing device responsive to determining the expiration, a second content item from the plurality of content items based on the information. In some arrangements, the method includes replacing, by the billboard computing device, the first content item with the second content item to cause display of the second content item within the second region of the screen.

In some arrangements, the method includes detecting, by the billboard computing device, an interaction with a menu item of the plurality of menu items. In some arrangements, the method includes selecting, by the billboard computing device responsive to detecting the interaction with the menu item, a trivia content item from the plurality of content items, the trivia content item comprising a first textual message indicative of a question and a second textual message indicative of a plurality of answer options. In some arrangements, the method includes selecting, by the billboard computing device responsive to detecting the interaction with the menu item, a default content item from the plurality of content items. In some arrangements, the method includes replacing, by the billboard computing device, the plurality of menu items with the trivia content item to cause display of the trivia content item within the first region of the screen, the concierge item displayed adjacent to the trivia content item within the first region. In some arrangements, the method includes replacing, by the billboard computing device, the first content item with the default content item to cause display of the default content item within the second region of the screen.

In some arrangements, the method includes detecting, by the billboard computing device, an interaction with a first answer option of the plurality of answer options. In some arrangements, the method includes removing, by the billboard computing device and responsive to detecting the interaction with the first answer option, the other answer options of the plurality of answer options from being displayed on the screen. In some arrangements, the method includes determining, by the billboard computing device, a first expiration of a predetermined period of time since removing the other answer options from being displayed on the screen. In some arrangements, the method includes selecting, by the billboard computing device responsive to determining the first expiration, a third content item from the plurality of content items, the third content item comprising a third textual message indicating that the first answer option is a correct answer to the question or the first answer option is not the correct answer to the question. In some arrangements, the method includes replacing, by the billboard computing device, the first answer option with the third content item to cause display of the third content item within the first region of the screen.

In some arrangements, the method includes determining, by the billboard computing device, a second expiration of a predetermined period of time since replacing the first answer option with the third content item to cause display of the third content item within the first region of the screen. In some arrangements, the method includes selecting, by the billboard computing device responsive to determining the first expiration, a fourth content item from the plurality of content items, the fourth content item comprising a fourth textual message comprising a plurality of percentages and the plurality of answer options, each percentage of the plurality of percentages indicating a number of users who selected a respective answer option of the plurality of answer options responsive to viewing the question being displayed on the screen. In some arrangements, the method includes replacing, by the billboard computing device, the third content item with the fourth content item to cause display of the fourth content item within the first region of the screen.

In some arrangements, the method includes detecting, by the billboard computing device, an interaction with a menu item of the plurality of menu items. In some arrangements, the method includes selecting, by the billboard computing device responsive to detecting the interaction with the menu item, an on-demand content item from the plurality of content items, the on-demand content item comprising a plurality of on-demand options. In some arrangements, the method includes replacing, by the billboard computing device, the plurality of menu items with the on-demand content item to cause display of the on-demand content item within the first region of the screen. In some arrangements, the method includes detecting, by the billboard computing device, an interaction with a first on-demand option of the plurality of on-demand options. In some arrangements, the method includes selecting, by the billboard computing device responsive to detecting the interaction with the first on-demand option, a second content from the plurality of content items, the second content item associated with the first on-demand option. In some arrangements, the method includes replacing, by the billboard computing device, the first content item with the second content item to cause display of the second content item within the second region of the screen.

In another aspect, the present disclosure is directed to a system for a method for providing interactive guidance to a user via a billboard computing device for navigating a workplace. In some arrangements, the system includes one or more processors; and one or more computer-readable storage mediums storing instructions which, when executed by the one or more processors, cause the one or more processors to receive, over a network and from a management server, a content package generated based on data associated with an organization, the content package including a plurality of menu items, a concierge item, and a plurality of content items; display, based on the content package, the concierge item and the plurality of menu items within a first region of a screen; display, based on the content package, a first content item of the plurality of content items within a second region of the screen; detect, based on the content package, an interaction with the concierge item displayed on the screen; and/or morph, responsive to detecting the interaction with the concierge item and based on the content package, the concierge item from a first display format to a second display format different from the first display format.

In some arrangements, the billboard computing device displays the concierge item of the first display format on the screen as one of a two-dimensional object and a three-dimensional object, wherein the billboard computing device displays the concierge item of the second display format on the screen as the other of the two-dimensional object and the three-dimensional object.

In some arrangements, the billboard computing device displays the concierge item of the first display format on the screen at a first position relative to the plurality of menu items, wherein the billboard computing device displays the concierge item of the second display format on the screen in a second position different from the first position.

In some arrangements, the billboard computing displays the concierge item of the second display format by animating the concierge item of the second display format to display at least one of a flipping movement, a twisting movement, a bouncing movement, and a rolling movement.

In some arrangements, the system includes one or more processors; and one or more computer-readable storage mediums storing instructions which, when executed by the one or more processors, cause the one or more processors to display a textual message within the second region of the screen, wherein the textual message provides guidance to interact with one or more of the plurality of menu items.

In some arrangements, the system includes one or more processors; and one or more computer-readable storage mediums storing instructions which, when executed by the one or more processors, cause the one or more processors to detect an interaction with a menu item of the plurality of menu items; and/or morph, responsive to detecting the interaction with the menu item, the concierge item from the first display format to the second display format different from the first display format based on the content package.

In some arrangements, the system includes one or more processors; and one or more computer-readable storage mediums storing instructions which, when executed by the one or more processors, cause the one or more processors to display a textual message within the second region of the screen, wherein the textual message provides guidance to interact with the menu item of the plurality of menu items, and the textual message is not associated with another menu item of the plurality of menu items.

In some arrangements, the system includes one or more processors; and one or more computer-readable storage mediums storing instructions which, when executed by the one or more processors, cause the one or more processors to detect an occurrence of a triggering event; and/or responsive to detecting the occurrence of the triggering event: remove the textual message from the screen, and morph the concierge item from the second display format to the first display format.

In some arrangements, the system includes one or more processors; and one or more computer-readable storage mediums storing instructions which, when executed by the one or more processors, cause the one or more processors to maintain, in a database, a plurality of associations between a plurality of historical textual messages and a plurality of historical display formats, each association of the plurality of associations corresponding to a historical textual message of the plurality of historical textual messages and a historical display format of the plurality of historical display formats used to display the concierge item, wherein each of the plurality of historical textual messages were previously displayed on the screen and removed from the screen.

In some arrangements, the system includes one or more processors; and one or more computer-readable storage mediums storing instructions which, when executed by the one or more processors, cause the one or more processors to receive a request to re-display one of the historical textual messages of the plurality of historical textual messages; retrieve, responsive to the request and from the database, the historical textual message and the historical display format associated with the historical textual message; morph the concierge item from the second display format to the historical display format; and/or display the historical textual message within the second region of the screen.

In some arrangements, the system includes one or more processors; and one or more computer-readable storage mediums storing instructions which, when executed by the one or more processors, cause the one or more processors to select, based on information associated with a building, the first content item from the plurality of content items for display within the second region of the screen, the billboard computing device being geographically proximate to the building; determine an expiration of a predetermined period of time since displaying the first content item within the second region of the screen; select, responsive to determining the expiration, a second content item from the plurality of content items based on the information; and/or replace the first content item with the second content item to cause display of the second content item within the second region of the screen.

In some arrangements, the system includes one or more processors; and one or more computer-readable storage mediums storing instructions which, when executed by the one or more processors, cause the one or more processors to detect an interaction with a menu item of the plurality of menu items; select, responsive to detecting the interaction with the menu item, a trivia content item from the plurality of content items, the trivia content item comprising a first textual message indicative of a question and a second textual message indicative of a plurality of answer options; select, responsive to detecting the interaction with the menu item, a default content item from the plurality of content items; replace the plurality of menu items with the trivia content item to cause display of the trivia content item within the first region of the screen, the concierge item displayed adjacent to the trivia content item within the first region; and/or replace the first content item with the default content item to cause display of the default content item within the second region of the screen.

In some arrangements, the system includes one or more processors; and one or more computer-readable storage mediums storing instructions which, when executed by the one or more processors, cause the one or more processors to detect an interaction with a first answer option of the plurality of answer options; remove, responsive to detecting the interaction with the first answer option, the other answer options of the plurality of answer options from being displayed on the screen; determine a first expiration of a predetermined period of time since removing the other answer options from being displayed on the screen; select, responsive to determining the first expiration, a third content item from the plurality of content items, the third content item comprising a third textual message indicating that the first answer option is a correct answer to the question or the first answer option is not the correct answer to the question; and/or replace the first answer option with the third content item to cause display of the third content item within the first region of the screen.

In some arrangements, the system includes one or more processors; and one or more computer-readable storage mediums storing instructions which, when executed by the one or more processors, cause the one or more processors to determine a second expiration of a predetermined period of time since replacing the first answer option with the third content item to cause display of the third content item within the first region of the screen; select, responsive to determining the first expiration, a fourth content item from the plurality of content items, the fourth content item comprising a fourth textual message comprising a plurality of percentages and the plurality of answer options, each percentage of the plurality of percentages indicating a number of users who selected a respective answer option of the plurality of answer options responsive to viewing the question being displayed on the screen; and/or replacing, by the billboard computing device, the third content item with the fourth content item to cause display of the fourth content item within the first region of the screen.

In some arrangements, the system includes one or more processors; and one or more computer-readable storage mediums storing instructions which, when executed by the one or more processors, cause the one or more processors to detecting, by the billboard computing device, an interaction with a menu item of the plurality of menu items; selecting, by the billboard computing device responsive to detecting the interaction with the menu item, an on-demand content item from the plurality of content items, the on-demand content item comprising a plurality of on-demand options; replacing, by the billboard computing device, the plurality of menu items with the on-demand content item to cause display of the on-demand content item within the first region of the screen; detecting, by the billboard computing device, an interaction with a first on-demand option of the plurality of on-demand options; selecting, by the billboard computing device responsive to detecting the interaction with the first on-demand option, a second content from the plurality of content items, the second content item associated with the first on-demand option; and/or replacing, by the billboard computing device, the first content item with the second content item to cause display of the second content item within the second region of the screen.

In another aspect, the present disclosure is directed to a non-transitory computer-readable storage medium storing instructions which, when executed by one or more processors, cause the one or more processors to perform operations including receiving, by a billboard computing device over a network and from a management server, a content package generated based on data associated with an organization, the content package including a plurality of menu items, a concierge item, and a plurality of content items. In some arrangements, the non-transitory computer-readable storage medium storing instructions which, when executed by one or more processors, cause the one or more processors to perform operations including displaying, by the billboard computing device and based on the content package, the concierge item and the plurality of menu items within a first region of a screen. In some arrangements, the non-transitory computer-readable storage medium storing instructions which, when executed by one or more processors, cause the one or more processors to perform operations including displaying, by the billboard computing device and based on the content package, a first content item of the plurality of content items within a second region of the screen. In some arrangements, the non-transitory computer-readable storage medium storing instructions which, when executed by one or more processors, cause the one or more processors to perform operations including detecting, by the billboard computing device and based on the content package, an interaction with the concierge item displayed on the screen. In some arrangements, the non-transitory computer-readable storage medium storing instructions which, when executed by one or more processors, cause the one or more processors to perform operations including morphing, by the billboard computing device responsive to detecting the interaction with the concierge item and based on the content package, the concierge item from a first display format to a second display format different from the first display format.

These and other features, together with the organization and manner of operation thereof, will become apparent from the following detailed description when taken in conjunction with the accompanying drawings.

BRIEF DESCRIPTION OF THE FIGURES

Like reference numbers and designations in the various drawings indicate like elements.

DETAILED DESCRIPTION

Figure 1:
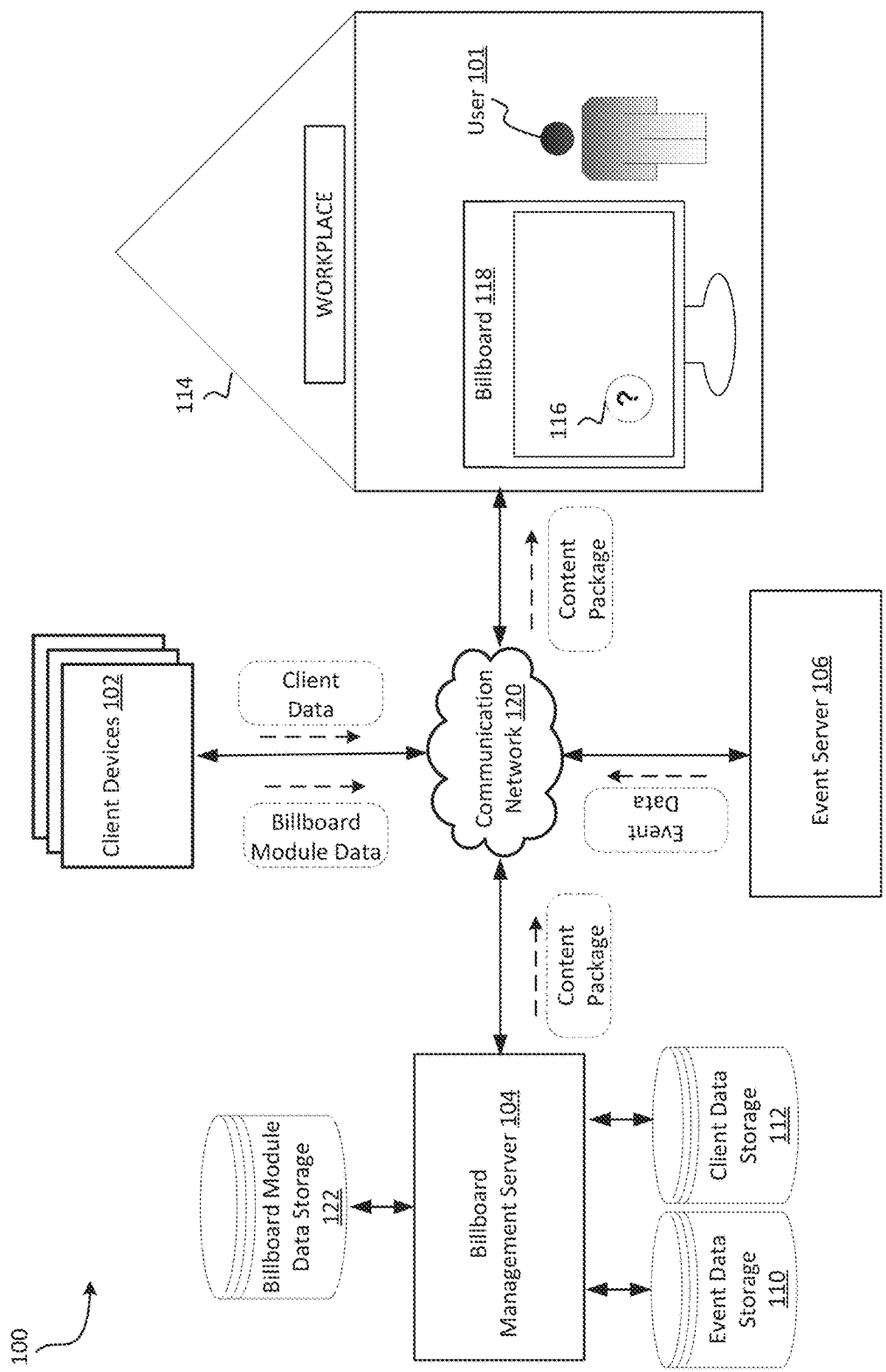
FIG. 1 is a block diagram depicting an example environment for providing interactive guidance to a user via a billboard computing device for navigating a workplace, according to some arrangements.

A lobby directory may also be placed in a workplace (e.g., a commercial/business building, etc.) to provide employees and guests with information about the workplace. For example, an employee seeking information about an upcoming meeting often expects to find information about that meeting, such as the meeting time and directions for navigating to the meeting room, in the workplace directory. Most workplace directories, however, rarely provide an easy-to-use and exciting interface for accessing such information. As such, the frustrated and disengaged employee often refuses to use the workplace directory in the future.

Accordingly, the present disclosure is directed to systems and methods for providing interactive guidance to a user via a billboard computing device (also sometimes referred to as, "Billboard") for navigating a workplace, thereby encouraging the user to search for and interact with the billboard computing device.

In general, the billboard computing device (e.g., billboard computing device 118 in FIG. 1) is an interactive workplace sign that could be placed in a lobby, atrium or entry point of a workplace. It includes a touch screen, or other user input means (e.g., a monitor with a keyboard and a mouse, etc.), allowing a user (e.g., a worker, a guest) to easily access information about the workspace, such as navigation instructions, lobby instructions, meeting location instructions, etc. The screen is divided into two sections with a first section/region, referred as the "home screen", that has a menu with various features that a user can select and a second section/region, referred to as the "attract loop", that shows content. To make the experience user friendly, the billboard computing device, has a "concierge" that provides audio, video, animations, and other information to explain the features available on the screen. On the home screen, the concierge is shown as a static, two-dimensional object under a menu bar. When a menu item is pressed, the concierge "comes alive" and will appear on the following screen as an animated (e.g., flipping, bouncing, rolling, etc.), three-dimensional object that explains how to use the features of the pressed/selected menu item. The billboard computing device also includes a gamification feature, referred to as "contest" that walks a user through a series of trivia questions to excite the user about the billboard computing device. The billboard computing device also includes an "Information on Demand" feature allowing a user who missed messages that appeared on the screen to retrieve those messages on-demand. By building the billboard computing device using a modular approach, any feature (e.g., the concierge, the gamification mode, the Information on Demand feature, etc.) and the overall appearance of how that feature is displayed on the screen may be fully customized and updated in real-time according to the workplace location (e.g., Los Angeles, CA., Hartford, CT., etc.) and the location of the billboard computing device within the workplace (e.g., per floor, per room, inside vs. outside, etc.) in order to encourage the workers and/or guests of a particular workplace to interact with the billboard computing device.

FIG. 1 is a block diagram depicting an example environment for providing interactive guidance to a user via a billboard computing device for navigating a workplace, according to some arrangements. The environment 100 includes client devices 102, a billboard management server 104, an event server 106, and billboard computing device 118 (shown in FIG. 1 as, "billboard 118") that are in communication with one another via a communication network 120. The billboard computing device 118 is proximate to the workplace 114, such as being located inside the workplace 114 or being located outside, and on the property of, of the workplace 114. The client devices 102, billboard management server 104, event server 106, and billboard computing device 118 each include hardware elements, such as one or more processors, logic devices, or circuits. The environment 100 includes an event data storage 110 for storing event data (e.g., weather data, calendar data, email, news, stock ticker data, etc.) provided by the event server 106. The environment 100 includes a client data storage 112 for storing client data (also referred to herein as, "a plurality of content items") provided by the one or more client devices 102. The client data may include, for example, audios, videos, blogs, personal messages, group messages, and notifications intended to be sent or shared with other users 101 of the workplace 114. The environment 100 includes a billboard module data storage 122 for storing billboard module data (e.g., data used to generate/build one or more modules of an application executing on billboard computing device 118, etc.) provided by the one or more client devices 102. The environment 100 includes a user 101 that interacts (e.g., via touching, via viewing, via speaking, etc.) with billboard computing device 118.

The client device 102 is an electronic computing device (also referred to herein as, a computing device) that is capable of sending client data and/or billboard module data to another electronic computing device (e.g., billboard management server 104, event server 106, billboard computing device 118, etc.) For example, the client device 102 may send client data indicative of a group message (e.g., "Our group meeting starts at 2 p.m. in Room 302") and billboard module data to the billboard management server 104. In response, the billboard management server 104 generates a content package based on the client data and the billboard module data, and delivers the content package to the billboard computing device 118. In response to receiving the content package, the billboard computing device 118 executes the content package which causes the billboard computing device 118 to display a user interface on a screen (e.g., touchscreen, etc.), and the group message in a region of the user interface. The client device 102 may be any number of different types of electronic computing devices adapted to communicate over a communication network 120, including without limitation, a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices.

The event server 106 is an electronic computing device, as discussed herein, that is capable of sending event data (also referred to herein as, "a plurality of content items") to another electronic computing device (e.g., billboard management server 104, client device 102, billboard computing device 118, etc.). The event data may include, for example, weather data, emergency messages, calendar data, email, news, and stock ticker data. For example, the billboard management server 104 and the event server 106 may form an agreement for event server 106 to provide event data to the billboard management server 104 on a periodic basis (e.g., hourly, daily, weekly, etc.) and/or in response to the occurrence of a triggering event (e.g., when particular events occur, when requested, etc.). That is, the event server 106 may receive a request from the billboard management server 104 to provide event data. In response to receiving the request, the event server 106 sends the event data to the billboard management server 104. The billboard management server 104 then generates a content package based on the client data and/or the billboard module data that the billboard management server 104 receives from the client device 102 and the event data the billboard management server 104 receives from the event server 106. The billboard management server 104 then delivers the content package to the billboard computing device 118. In response to receiving the content package, the billboard computing device 118 executes the content package causing the billboard computing device 118 to display a user interface on a screen (e.g., touchscreen, etc.), and the event data in a region of the user interface.

The billboard management server 104 is an electronic computing device that is associated with an organization and capable of receiving billboard module data and any type of content items (e.g., client data, event data) from another electronic computing device. The billboard management server 104 is also capable of generating (e.g., assembling, building) a content package based on the billboard module data and/or one or more of the plurality of content items. The billboard management server 104 is also capable of sending the content package to the billboard computing device 118 causing the billboard computing device 118 to execute the content package. In some arrangements, the billboard management server 104 attaches (e.g., inserts, embeds, appends, wraps, etc.) computer code to the content package, such that the computer code causes the billboard computing device 118 to execute the content package upon receiving the content package (with the attached code) from the billboard management server 104. The billboard management server 104 is also capable of storing the client data in a storage (e.g., event data storage 110), the event data in a storage (e.g., event data storage 110), and the billboard module data in a storage (e.g., billboard module data storage 122). The billboard management server is also capable of retrieving data from any of these storages at any time.

The billboard computing device 118 is an electronic computing device that is associated with an organization and capable of receiving a content package from another electronic computing device (e.g., billboard management server 104, etc.). The billboard computing device 118 controls a screen (e.g., a touch screen, etc.) for displaying information based on executing a content package it receives from the billboard management server 104. The billboard computing device 118 may detect and/or receive one or more commands from a user 101 through a variety of interfaces (as discussed herein with respect to FIG. 2B). For example, the billboard computing device 118 may receive touching commands via a touchscreen (e.g., screen 230B in FIG. 2B), audio commands via a microphone (e.g., microphone 234B in FIG. 2B), and/or visual commands via one or more cameras (e.g., microphone 234B in FIG. 2B).

In some arrangements, to preserve privacy, the billboard computing device 118 may be configured to detect and obfuscate (e.g., blur, scramble, remove, omit, fill, darken, etc.) one or more facial features in an image and/or video that are gathered via the one or more cameras, before storing the image and/or video in a database. In some arrangements, to preserve privacy, the billboard computing device 118 may be configured to delete (e.g., destroy, erase, scramble, encrypt, etc.) an image and/or video that are gathered via the one or more cameras, responsive to processing the corresponding visual commands.

In some arrangements, to preserve privacy, the billboard computing device 118 may be configured to distort (e.g., scramble, encrypt, modulate, etc.) the audio commands that are gathered via the microphone before storing the audio commands in a database, to prevent others from determining the identity of the speaker.

The billboard computing device 118 may be any number of different types of electronic computing devices adapted to communicate over a communication network 120, including without limitation, a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices.

The workplace 114 may be any location where an individual (e.g., user 101) works at an organization, such as a financial institution, a brokerage house, an investment company/bank, a corporation, a law firm, a factory, an office, an insurance company, a medical provider, a school campus, a charitable organization, etc. A workplace 114 location may include a building consisting of one or more floors, windows, rooms, offices, cafeterias, meeting and/or conference rooms, lobbies, hallways, fitness rooms, etc.

The communication network 120 is a local area network (LAN), a wide area network (WAN), a personal area network (PAN), or a combination of these or other networks, that interconnects the electronic computing devices (as discussed herein) and/or databases. The environment 100 may include many thousands of client devices 102, billboard management servers 104, event servers, and billboard computing devices 118 interconnected in any arrangement to facilitate the exchange of data between such electronic computing devices. Although only one billboard is shown in a workplace 114, a workplace include any number of billboard computing devices 118 on any number of floors of the workplace 114. In some arrangements, any number of workplaces 114 may be communicatively connected to (via a respective billboard computing device 118 and/or networking architecture associated with the respective workplace 114) and controlled by a single billboard management server 104.

Figure 2B:
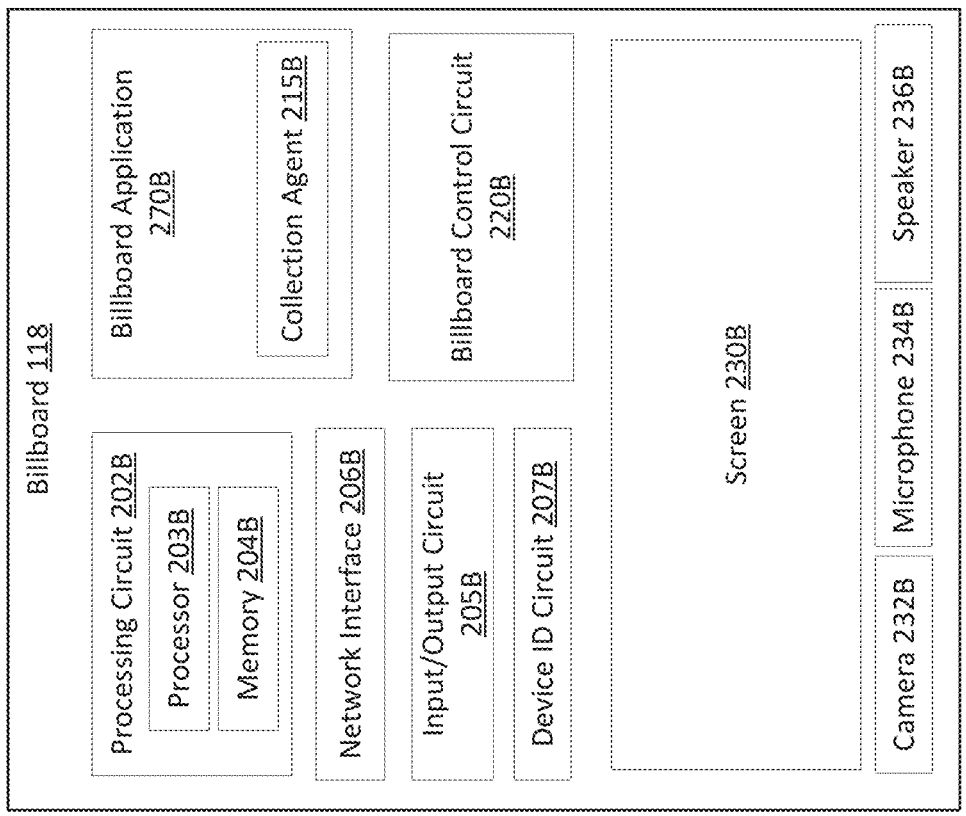
FIG. 2B is a block diagram depicting an example billboard computing device of the environment in FIG. 1, according to some arrangements.
Figure 2A:
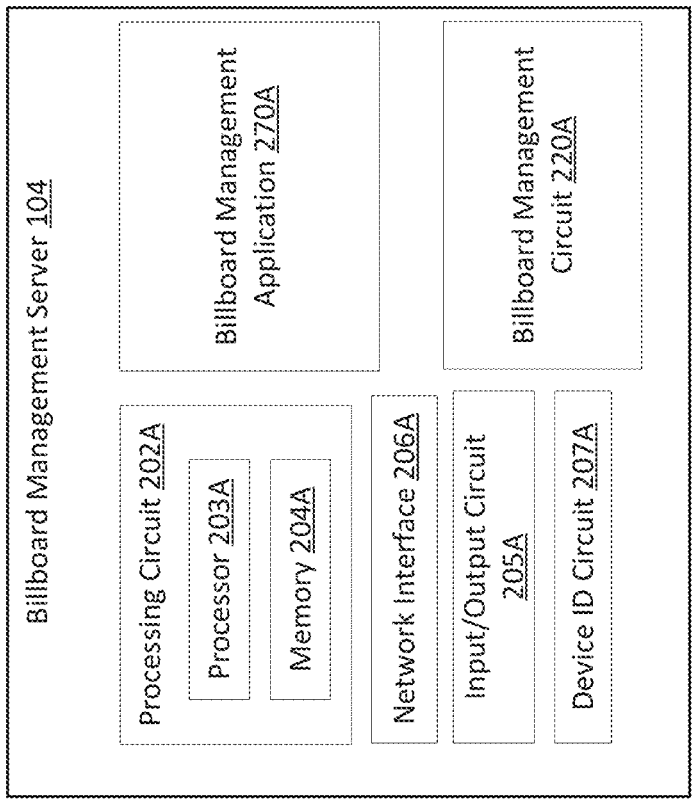
FIG. 2A is a block diagram depicting an example billboard management server of the environment in FIG. 1, according to some arrangements.

FIG. 2A is a block diagram depicting an example billboard management server of the environment in FIG. 1, according to some arrangements. While various circuits, interfaces, and logic with particular functionality are shown, it should be understood that the billboard management server 104 includes any number of circuits, interfaces, and logic for facilitating the functions described herein. For example, the activities of multiple circuits may be combined as a single circuit and implemented on a single processing circuit (e.g., processing circuit 202A), as additional circuits with additional functionality are included.

The billboard management server 104 includes a processing circuit 202A composed of one or more processors 203A and a memory 204A. A processor 203A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203A may be a multi-core processor or an array (e.g., one or more) of processors.

The memory 204A (e.g., Random Access Memory (RAM), Read-Only Memory (ROM), Non-volatile RAM (NVRAM), Flash Memory, hard disk storage, optical media, etc.) of processing circuit 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processor 203A, controls the operations of the billboard management server 104. In some arrangements, the processor 203A and the memory 204A form various processing circuits described with respect to the billboard management server 104. The instructions include code from any suitable computer programming language such as, but not limited to, C, C++, C #, Java, JavaScript, VBScript, Perl, HTML, XML, Python, TCL, and Basic.

The billboard management server 104 includes a network interface 206A configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the billboard management server 104 includes a plurality of network interfaces 206A of different types, allowing for connections to a variety of networks, such as local area networks or wide area networks including the Internet, via different sub-networks.

The billboard management server 104 includes an input/output circuit 205A configured to receive user input from and provide information to a user 101. In this regard, the input/output circuit 205A is structured to exchange data, communications, instructions, etc. with an input/output component of the billboard management server 104. Accordingly, the input/output circuit 205A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, a camera, etc.). The one or more user interfaces may be internal to the housing of the billboard management server 104, such as a built-in display, touch screen, microphone, camera, etc., or external to the housing of the billboard management server 104, such as a monitor connected to the billboard management server 104, a speaker connected to the billboard management server 104, etc., according to various arrangements. In some arrangements, the input/output circuit 205A includes communication circuitry for facilitating the exchange of data, values, messages, and the like between the input/output device and the components of the billboard management server 104. In some arrangements, the input/output circuit 205A includes machine-readable media for facilitating the exchange of information between the input/output device and the components of the billboard management server 104. In still another arrangement, the input/output circuit 205A includes any combination of hardware components (e.g., a touchscreen), communication circuitry, and machine-readable media. In some arrangements (referred to as "headless servers"), the input/output circuit may be omitted from the billboard management server 104, but still may communicate with an electronic computing device via network interface 206A.

The billboard management server 104 includes a device identification circuit 207A (shown in FIG. 2A as device ID circuit 207A) configured to generate and/or manage a device identifier associated with the billboard management server 104. The device identifier may include any type and form of identification used to distinguish the billboard management server 104 from other computing devices. In some arrangements, a device identifier may be associated with one or more other device identifiers. In some arrangements, to preserve privacy, the device identifier may be cryptographically generated, encrypted, or otherwise obfuscated by any circuit of the billboard management server 104. In some arrangements, the billboard management server 104 may include the device identifier in any communication (e.g., a content package) that the billboard management server 104 sends to a computing device.

The billboard management server 104 includes (or executes on one or more processors) an billboard management application 270A that is communicably coupled to the communication network 120 allowing the billboard management server 104 to send/receive data to any other computing device (e.g., client device 102, billboard computing device 118, event server 106) connected to the communication network 120. The billboard management application 270A may be an internet/web browser, a graphic user interface (GUI), an email reader/client, a File Transfer Protocol (FTP) client, a virtual machine application, or a banking client application independent from an internet/web browser.

The billboard management server 104 includes a billboard management circuit 220A that may be configured to receive, via the communication network 120, billboard module data and any type of content item (e.g., client data, event data, etc.) from another electronic computing device.

The billboard management circuit 220A may be configured to generate (e.g., assemble, build) a content package based on the billboard module data and/or one or more of the plurality of content items. In some arrangements, the billboard management server 104 may attach (e.g., inserts, embeds, appends, wraps, etc.) computer code to the content package when generating the content package. The computer code may instruct a computing device (e.g., billboard computing device) that receives the content package as to how to unpack (e.g., unzip), assemble, and/or execute the content package.

The billboard management circuit 220A may be configured to send the content package to the billboard computing device 118 causing the billboard computing device 118 to execute the content package. In some arrangements, the content package causes the billboard computing device 118 to execute the content package via an application (e.g., billboard application 270B in FIG. 2B) executing on the billboard computing device 118. In some arrangements, the billboard management server 104 attaches computer code to the content package, such that the computer code causes the billboard computing device 118 to execute the content package in response to receiving the content package (with the attached code) from the billboard management server 104.

The billboard management circuit 220A may be configured to store the client data in a storage (e.g., event data storage 110), the event data in a storage (e.g., event data storage 110), and/or the billboard module data in a storage (e.g., billboard module data storage 122). The billboard management server may be configured to retrieve data from any of these storages at any time.

The billboard management server 104 includes a bus (not shown), such as an address/data bus or other communication mechanism for communicating information, which interconnects circuits and/or subsystems of the billboard management server 104. In some arrangements, the billboard management server 104 may include one or more of any such circuits and/or subsystems.

In some arrangements, some or all of the circuits of the billboard management server 104 may be implemented with the processing circuit 202A. For example, the billboard management circuit 220A may be implemented as a software application stored within the memory 204A and executed by the processor 203A. Accordingly, such arrangement can be implemented with minimal or no additional hardware costs. In some arrangements, any of these above-recited circuits rely on dedicated hardware specifically configured for performing operations of the circuit.

FIG. 2B is a block diagram depicting an example billboard computing device of the environment in FIG. 1, according to some arrangements. While various circuits, interfaces, and logic with particular functionality are shown, it should be understood that the billboard computing device 118 includes any number of circuits, interfaces, and logic for facilitating the functions described herein. For example, the activities of multiple circuits may be combined as a single circuit and implemented on a single processing circuit (e.g., processing circuit 202B), as additional circuits with additional functionality are included.

The billboard computing device 118 includes a processing circuit 202B composed of one or more processors 203A and a memory 204B. The processing circuit 202B includes identical or nearly identical functionality as the processing circuit 202A in FIG. 2A, but with respect to circuits and/or subsystems of the billboard computing device 118 instead of circuits and/or subsystems of the billboard management server 104 in FIG. 2A.

The memory 204BA (e.g., Random Access Memory (RAM), Read-Only Memory (ROM), Non-volatile RAM (NVRAM), Flash Memory, hard disk storage, optical media, etc.) of processing circuit 202B stores data and/or computer instructions/code for facilitating at least some of the various processes described herein. The memory 204B includes identical or nearly identical functionality as the memory 204A in FIG. 2A, but with respect to circuits and/or subsystems of the billboard computing device 118 instead of circuits and/or subsystems of the billboard management server 104 in FIG. 2A.

The billboard computing device 118 includes a network interface 206B configured to establish a communication session with a computing device for sending and receiving data over the communication network 120 to the computing device. Accordingly, the network interface 206B includes identical or nearly identical functionality as the network interface 206A in FIG. 2A, but with respect to circuits and/or subsystems of the billboard computing device 118 instead of circuits and/or subsystems of the billboard management server 104 in FIG. 2A.

The billboard computing device 118 includes an input/output circuit 205B configured to receive user input from and provide information to a user. In this regard, the input/output circuit 205B is structured to exchange data, communications, instructions, etc. with an input/output component of the billboard management server 104. The input/output circuit 205B includes identical or nearly identical functionality as the input/output circuit 205A in FIG. 2A, but with respect to circuits and/or subsystems of the billboard computing device 118 instead of circuits and/or subsystems of the billboard management server 104 in FIG. 2A.

The billboard computing device 118 includes a device identification circuit 207B (shown in FIG. 2B as device ID circuit 207B) configured to generate and/or manage a device identifier associated with the billboard management server 104. The device ID circuit 207B includes identical or nearly identical functionality as the device ID circuit 207A in FIG. 2A, but with respect to circuits and/or subsystems of the billboard computing device 118 instead of circuits and/or subsystems of the billboard management server 104 in FIG. 2A.

The billboard computing device 118 includes (or executes on one or more processors) a billboard application 270B that is communicably coupled to the communication network 120 allowing the billboard computing device 118 to send/receive data to any other computing device (e.g., client device 102, billboard computing device 118, event server 106, etc.) connected to the communication network 120. The billboard application 270B may be an internet/web browser, a graphic user interface (GUI), an email reader/client, a File Transfer Protocol (FTP) client, a virtual machine application, or a banking client application independent from an internet/web browser.

The billboard application 270B is configured to recognize and read (or execute) the contents (e.g., client data, event data, billboard module data, computer code, etc.) of a content package and control any of the circuits and/or subsystems of the billboard computing device 118 based on the contents of a content package. For example, the billboard application 270B may display a GUI on a touchscreen display (e.g., screen 230B) and populate regions (e.g., also referred to herein as "a first region of a screen" and "a second region of a screen") of the GUI with one or more content items (e.g., also referred to herein as "a first content item", "a second content item", "a third content item", "a fourth content item", "a default content item", a trivia content item", "on-demand content item", etc.) based on reading and executing the content package.

The billboard application 270B includes a collection agent 215B. The collection agent 215B may include an application plug-in, application extension, subroutine, browser toolbar, daemon, or other executable logic for collecting data processed by the billboard application 270B and/or monitoring interactions of user with the input/output circuit 205B. In other arrangements, the collection agent 215B may be a separate application, service, daemon, routine, or other executable logic separate from the billboard application 270B but configured for intercepting and/or collecting data processed by the billboard application 270B, such as a screen scraper, packet interceptor, application programming interface (API) hooking process, or other such application. The collection agent 215B is configured for intercepting or receiving data input via the input/output circuit 205B, including mouse clicks, scroll wheel movements, gestures such as swipes, pinches, or touches (e.g., touches to screen 230B in FIG. 2B), or any other such interactions; as well as data received and processed by the billboard application 270B. The collection agent 215B, may begin intercepting/gathering/receiving data input via its respective input/output circuit based on any triggering event, including, e.g., a power-up of the billboard application 270B, a launch of any software application executing on processing circuit 202B, or a receipt of a content package from another computing device.

The billboard computing device 118 includes a screen 230B for displaying information to users 101 that are interacting with (or proximate to) the billboard computing device 118. The screen may be configured as a smart screen or as a touchscreen for receiving touching commands from users 101 that are interacting with the billboard computing device 118.

The billboard computing device 118 includes one or more cameras 232B configured to view bodily movements, facial expressions, and bodily gestures made by users 101 that are interacting with (or proximate to) billboard computing device 118.

The billboard computing device 118 includes one or more speakers 236B configured to provide messages and/or commands to users 101 that are interacting with (or proximate to) the billboard computing device 118.

The billboard computing device 118 includes a billboard control circuit 220B configured to receive, over communication network 120 and from a billboard management server 104, a content package generated based on data (e.g., client data, event data, billboard module data, etc.) associated with an organization. In some arrangements, the content package including a plurality of menu items (e.g., menu items 302*a*-312*a* in FIG. 3A), a concierge item (e.g., 316*a* in FIG. 3A), and a plurality of content items (e.g., 320*a* in FIG. 3A). A content item may include client data (e.g., audio, videos, blogs, personal messages, group messages, notifications to other users 101 of the workplace 114, etc.), event data (e.g., weather data, calendar data, email, news, stock ticker data, etc.), and or billboard module data. For example, a content item may include textual information, an image file (e.g., png, jpg, bmp, etc.), a video (e.g., .mpeg, .mp4, .wav, etc.), and/or an audio file (e.g., .mp3, etc.).

In response to receiving the content package, the billboard control circuit 220B may display, based on the content package, the concierge item and the plurality of menu items within a first region (e.g., 314*a* in FIG. 3A) of a screen. The billboard control circuit 220B may display, based on the content package, a first content item (e.g., 320*a* in FIG. 3A) of the plurality of content items within a second region (e.g., 318*a* in FIG. 3A) of the screen. The billboard control circuit 220B may detect, based on the content package, an interaction (e.g., touching, clicking, etc.) with the concierge item displayed on the screen. For example, the billboard control circuit 220B may detect that a user 101 touched a region of the screen associated with a menu item of the plurality of menu items, a concierge item, or a content item in the second region. In response to detecting the interaction with a concierge item and based on the content package, the billboard control circuit 220B may morph (e.g., transform, convert, change, modify, etc.) the concierge item from a first display format (e.g., a static icon, a two-dimensional icon) to a second display format (e.g., an active icon, an animated icon, a three-dimensional icon) different from the first display format. For example, the billboard control circuit 220B may morph the concierge item from a two-dimensional icon to a three-dimensional icon. A display format may include, for example, a static icon (e.g., 316*a* in FIG. 3A), a two-dimensional icon (e.g., 316*a* in FIG. 3A), an active icon (e.g., 316*b* in FIG. 3B, 416*d* in FIG. 4D), a colored icon (e.g., 416*c* in FIG. 4C), an animated icon (e.g., 416*d* in FIG. 4D, 416*e* in FIG. 4E), a three-dimensional icon (e.g., 416*d* in FIG. 4D), an icon having movement (e.g., 416*e* in FIG. 4E). Non-limiting examples of movement may include flipping, twisting, bouncing, pinching, shaking, traversing across the screen, floating on the screen, overlapping a region of the screen, and overlapping a content item displayed on the screen.

In some arrangements, the billboard control circuit 220B may be configured to display the concierge item of the first display format on the screen as a two-dimensional object and concierge item of the second display format on the screen as a three-dimensional object. In some arrangements, a two-dimensional object may also have movement when being displayed on the screen.

In some arrangements, the billboard control circuit 220B may be configured to display the concierge item of the first display format on the screen at a first position (e.g., the position of 316*a* in FIG. 3A) relative to the plurality of menu items and the concierge item of the second display format on the screen in a second position (e.g., the position of 416*b* in FIG. 4B) different from the first position.

In some arrangements, the billboard control circuit 220B may be configured to display the concierge item of the second display format by animating the concierge item of the second display format to display at least one of a flipping movement, a twisting movement, a bouncing movement, and a rolling movement.

In some arrangements, the billboard control circuit 220B may be configured display a textual message (e.g., 417*f* in FIG. 4F) within the second region of the screen. In some arrangements, the textual message may be associated with one or more of the plurality of menu items. For example, the text message may state "Make Your Selection" to instruct a user 101 to select a menu item from the plurality of menu items displayed on the screen.

In some arrangements, the billboard control circuit 220B may be configured to detect an interaction with a menu item of the plurality of menu items. In response to detecting the interaction, the billboard control circuit 220B morphs the concierge item from a first display format to a second display format different from the first display format based on the content package.

In some arrangements, the billboard control circuit 220B may be configured to display a textual message within the second region of the screen, the textual message associated with the menu item of the plurality of menu items and not associated with another menu item of the plurality of menu items. For example, the billboard control circuit 220B may detect that a user 101 selected menu item 302*b* in FIG. 3B (e.g., "Find your meeting") and in response, the billboard control circuit 220B may display within the second region of the screen a textual message indicating a location (e.g., a room number, a floor number, an address associated with a building) of a meeting associated with the user 101.

In some arrangements, the billboard control circuit 220B may be configured to detect an occurrence of a triggering event and, responsive to detecting the occurrence of the triggering event, remove the textual message from the screen and morph the concierge item from the second display format to the first display format. A triggering event may include, for example, an expiration of a timer or the detection of a second interaction with the concierge item or any of the menu items displayed on the screen.

In some arrangements, the billboard control circuit 220B may provide a user 101 with an option to see any messages they may have missed and revisit ones they have seen before but want to review again. For example, the billboard control circuit 220B may be configured maintain, in a database (e.g., billboard module data storage 122, event data storage 110, client data storage 112), a plurality of associations between a plurality of historical textual messages and a plurality of historical display formats, each association of the plurality of associations corresponding to a historical textual message of the plurality of historical textual messages and a historical display format of the plurality of historical display formats used to display the concierge item when the historical textual message was simultaneously displayed on the screen, each of the historical textual messages removed from the screen. The billboard control circuit 220B may further be configured to receive a request to re-display one of the historical textual messages of the plurality of historical textual messages. The billboard control circuit 220B may further be configured to retrieve, responsive to the request and from the database, the historical textual message and the historical display format associated with the historical textual message. The billboard control circuit 220B may further be configured to morphing the concierge item from the second display format to the historical display format. The billboard control circuit 220B may further be configured to display the historical textual message within the second region of the screen.

In some arrangements, the billboard control circuit 220B may display content information (e.g., event information, etc.) in a region of the screen. For example, the billboard control circuit 220B may be configured to select, based on information (e.g., building layout, geographical location of the building, weather, news, calendar information, meeting information, etc.) associated with a building, the first content item from the plurality of content items for display within the second region of the screen. In some arrangements, the billboard computing device 118 housing the control circuit 220B is geographically proximate to the building. The billboard control circuit 220B may further be configured to determine an expiration of a predetermined period of time since displaying the first content item within the second region of the screen. The billboard control circuit 220B may further be configured to select, responsive to determining the expiration, a second content item from the plurality of content items based on the information. The billboard control circuit 220B may further be configured to replace the first content item with the second content item to cause display of the second content item within the second region of the screen.

Figure 5A:
FIG. 5A is a screen capture depicting an example contest screen including a trivia content item and a concierge item in an animated state, wherein the contest screen being displayed by an example billboard computing device of the environment in FIG. 1, according to some arrangements.

The billboard control circuit 220B supports a gamification mode (also referred to as, "Contest") to promote interactivity with the billboard computing device 118 by a user 101. For example, the billboard control circuit 220B may be configured to detect an interaction with a menu item (e.g., 310*b* in FIG. 3B which is entitled "Contest") of the plurality of menu items. The billboard control circuit 220B may further be configured to select, responsive to detecting the interaction with the menu item, a trivia content item from the plurality of content items. The trivia content item includes a first textual message indicative of a question and a second textual message indicative of a plurality of answer options. For example, as shown in FIG. 5A, a textual message 540*a* may state, "Question 1", the answer option 552*a* may state "Answer 1", the answer option 554*a* may state "Answer 2", the answer option 556*a* may state "Answer 3", the answer option 558*a* may state "Answer 4", and the answer option 560*a* may state "Answer 5".

The billboard control circuit 220B may further be configured to select, responsive to detecting the interaction with the menu item, a default content item (e.g., 520*a* in FIG. 5A) from the plurality of content items. A default content item may be the content item that the billboard control circuit 220B selects to display in the second region of the screen responsive to detecting an interaction with a menu item associated with a gamification mode or feature. The billboard control circuit 220B may further be configured to replace the plurality of menu items with the trivia content item to cause display of the trivia content item within the first region (e.g., 514a in FIG. 5A) of the screen. In some arrangements, the concierge item (e.g., 516c in FIG. 5A) is displayed adjacent to the trivia content item within the first region. The billboard control circuit 220B may further be configured to replace the first content item with the default content item to cause display of the default content item within the second region (e.g., 518a in FIG. 5A) of the screen.

Figure 5B:
FIG. 5B is a screen capture depicting an example contest screen including an indication that a user selected an answer option from the trivia content item and a concierge item in an animated state, wherein the contest screen being displayed by an example billboard computing device of the environment in FIG. 1, according to some arrangements.
Figure 5B:
Figure 5B:
Figure 5B:
Figure 5C:
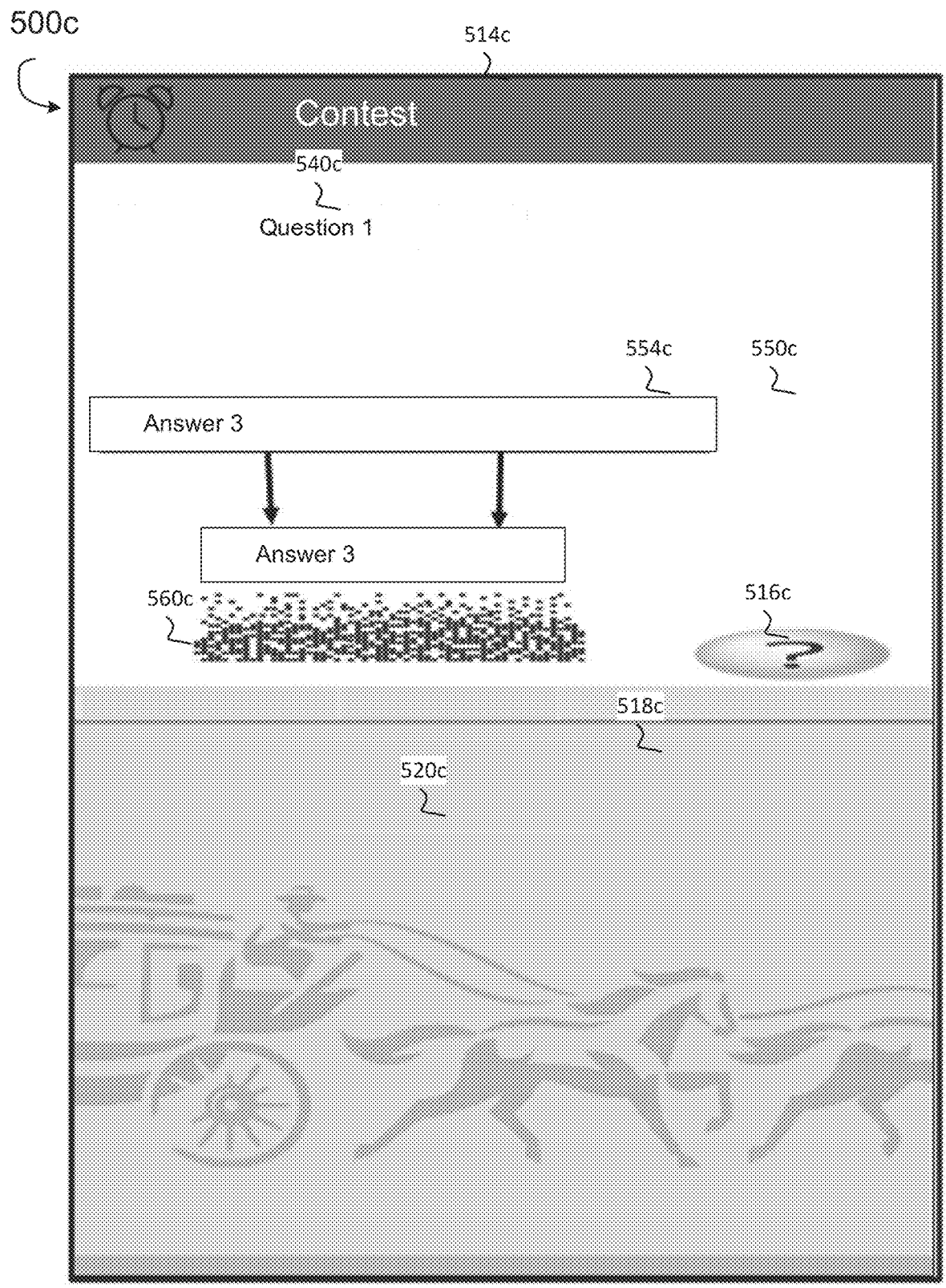
FIG. 5C is a screen capture depicting an example contest screen including a concierge item in an animated state and a removal of one or more unselected answer options from the contest screen, wherein the contest screen being displayed by an example billboard computing device of the environment in FIG. 1, according to some arrangements.

Continuing with the description of the gamification mode, the billboard control circuit 220B may be configured to detect an interaction with a first answer option of the plurality of answer options. The billboard control circuit 220B may further be configured to remove, responsive to detecting the interaction with the first answer option, the other answer options of the plurality of answer options from being displayed on the screen. For example, as shown in FIG. 5B, the user 101 may select an answer option corresponding with "Answer 3". In response, as shown in FIG. 5C, all other answer options (e.g., Answer 1, Answer 2, Answer 4, and Answer 5) are removed from the display. The billboard control circuit 220B may further be configured to determine a first expiration of a predetermined period of time (e.g., seconds, minutes, etc.) since removing the other answer options from being displayed on the screen.

Figure 5D:
FIG. 5D is a screen capture depicting an example contest screen including an indication that a user selected an incorrect answer option to the question, wherein the contest screen being displayed by an example billboard computing device of the environment in FIG. 1, according to some arrangements.

The billboard control circuit 220B may further be configured to select, responsive to determining the first expiration, a third content item from the plurality of content items. In some arrangements, the third content item may include a third textual message indicating that the first answer option is a correct answer to the question or the first answer option is not the correct answer to the question. The billboard control circuit 220B may further be configured to replace the first answer option with the third content item to cause display of the third content item within the first region of the screen. The third content item may be a text message informing the user 101 that the user 101 selected the wrong answer. For example, as shown in FIG. 5D, the billboard control circuit 220B detects an interaction indicating that the user 101 selected an answer option, removes the unselected answer options from the screen, and after waiting a predetermined amount of time, replaces the first region of the screen with a message stating, "Your answer is incorrect".

Still continuing with the description of the gamification mode, the billboard control circuit 220B may allow a user 101 to compete against other users 101 that are located on other floors in the same building by showing which floor has selected the correct answer the most times. For example, as shown in FIG. 5H, the billboard control circuit 220B may be configured to determine a second expiration of a predetermined period of time since replacing the first answer option with the third content item to cause display of the third content item within the first region of the screen. The billboard control circuit 220B may further be configured to select, responsive to determining the first expiration, a fourth content item from the plurality of content items. In some arrangement, the fourth content item includes a fourth textual message comprising a plurality of percentages and the plurality of answer options. Each percentage of the plurality of percentages indicates a number of users who selected a respective answer option of the plurality of answer options responsive to viewing the question being displayed on the screen. The billboard control circuit 220B may further be configured to replace the third content item with the fourth content item to cause display of the fourth content item within the first region of the screen.

The billboard control circuit 220B supports an "Info on Demand" mode, allowing a user 101 to view any message (e.g., a content item) previously displayed on the screen, but missed by the user 101. For example, the billboard control circuit 220B may be configured to detect an interaction with a menu item (e.g., 304c in FIG. 3C which is entitled "Info on-demand") of the plurality of menu items. The billboard control circuit 220B may be configured to select, responsive to detecting the interaction with the menu item, an on-demand content item (e.g., 402b in FIG. 4B) from the plurality of content items. In some arrangements, the on-demand content item includes a plurality of on-demand options (e.g., 432b-440b in FIG. 4B). The billboard control circuit 220B may be configured to replace the plurality of menu items with the on-demand content item to cause display of the on-demand content item within the first region (e.g., 414b in FIG. 4B) of the screen.

The billboard control circuit 220B may be configured to detect an interaction with a first on-demand option (e.g., 434g in FIG. 4G which is entitled "News") of the plurality of on-demand options. The billboard control circuit 220B may be configured to select, responsive to detecting the interaction with the first on-demand option, a second content (e.g., 420g in FIG. 4G) from the plurality of content items. In some arrangements, the second content item associated with the first on-demand option. The billboard control circuit 220B may be configured to replace the first content item with the second content item to cause display of the second content item within the second region (e.g., 418g in FIG. 4G) of the screen.

The billboard computing device 118 includes a bus (not shown), such as an address/data bus or other communication mechanism for communicating information, which interconnects circuits and/or subsystems of the billboard computing device 118. In some arrangements, the billboard management server 104 may include one or more of any such circuits and/or subsystems.

In some arrangements, some or all of the circuits of the billboard computing device 118 may be implemented with the processing circuit 202B. For example, the billboard control circuit 220B may be implemented as a software application stored within the memory 204B and executed by the processor 203B. Accordingly, such arrangement can be implemented with minimal or no additional hardware costs. In some arrangements, any of these above-recited circuits rely on dedicated hardware specifically configured for performing operations of the circuit.

Figure 3A:
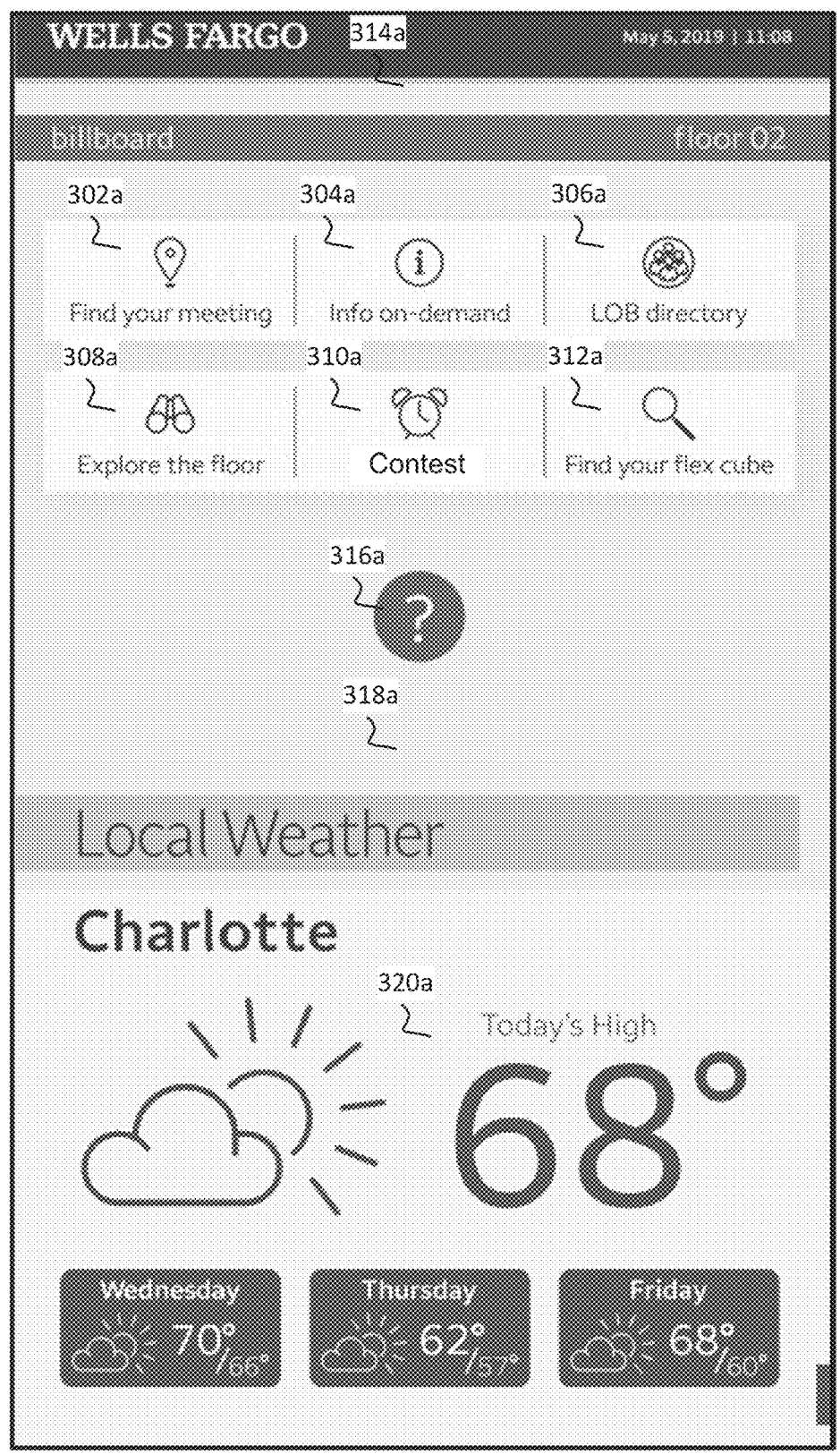
FIG. 3A is a screen capture depicting an example main screen including a concierge item in a static state, wherein the main screen being displayed by an example billboard computing device of the environment in FIG. 1, according to some arrangements.

FIG. 3A is a screen capture depicting an example main screen including a concierge item in a static state, wherein the main screen being displayed by an example billboard computing device of the environment in FIG. 1, according to some arrangements. The main screen 300a includes a first region 314a (also referred to herein as, "the home screen") and a second region 318a (also referred to herein as, "the attract loop"). The first region 314a allows a user 101 to know the list of features that are available for selection. As shown, the first region 314a includes menu item 302a, 304a, 306a, 308a, 310a, and 312a (collectively referred to herein as, menu items 302a-312a). In response to a user selecting menu item 302a, which is entitled "Find your meeting", the billboard computing device 118 gathers information (e.g., meeting location, meeting room, meeting time, etc.) about a meeting associated with the user 101 and displays the information on the screen. In response to a user selecting menu item 304a, which is entitled "Info on-demand", the billboard computing device 118 redraws the main screen 300a as any of the screens shown in FIG. 4A-4F for the user 101 to select from a plurality of on-demand options.

In response to a user selecting menu item 306a, which is entitled "LOB directory", the billboard computing device 118 displays a lobby directory on the screen. In response to a user selecting menu item 308d, which is entitled "Explore the floor", the billboard computing device 118 displays information about the building where the billboard computing device 118 is located to assist a user 101 in navigating through the building. In response to a user selecting menu item 310a, which is entitled "Contest", the billboard computing device 118 enters the gamification mode, as shown in FIG. 5A. In response to a user selecting menu item 312a, which is entitled "Find your flex cube", the billboard computing device 118 will find the flex cube associated or assigned to the user 101.

The billboard computing device 118 inserts a content item 320a in the second region 318a or "attract loop" responsive to an interaction by the user 101 with the screen 230B. In some arrangements, the billboard computing device 118 cycles (e.g., replaces, refreshes, updates, etc.) between different content items (e.g., weather, news, etc.) on a periodic basis (e.g., every minute, every hour, every day, every month, etc.). In some arrangements, the billboard computing device 118 may swap (e.g., interchange, trade, etc.) the display locations of the first region 314a (e.g., "the home screen") and the second region 318a (e.g., "the attract loop"). For example, the billboard computing device 118 may draw the second region 318a on the top of the screen and the first region 314a on the bottom of the screen.

The first region 314a includes a concierge item 316a that is shown as a static, two-dimensional object.

Figure 3B:
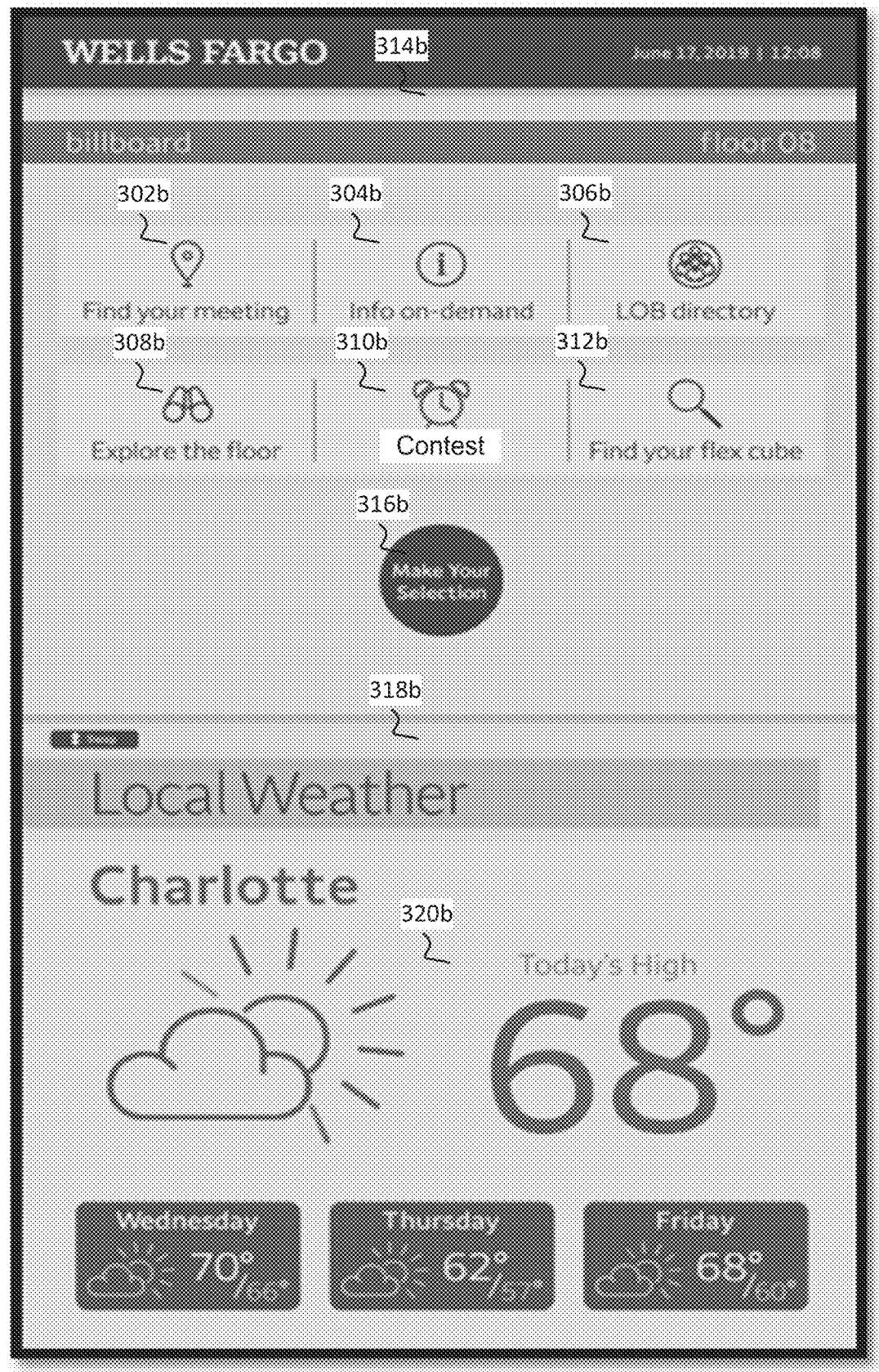
FIG. 3B is a screen capture depicting an example main screen including a concierge item in an animated state, wherein the main screen being displayed by an example billboard computing device of the environment in FIG. 1, according to some arrangements.

FIG. 3B is a screen capture depicting an example main screen including a concierge item in an animated state, wherein the main screen being displayed by an example billboard computing device of the environment in FIG. 1, according to some arrangements. The main screen 300b includes a first region 314b (e.g., the home screen) and a second region 318b (e.g., the attract loop). The first region 314b includes menu item 302b, 304b, 306b, 308b, 310b, and 312b. The second region 318b includes content item 320b. The first region 314b includes a concierge item 316b that is shown in an animated state as a two-dimensional object and containing a textual message.

As shown in FIG. 3B, the textual message may provide information associated with one or more objects (e.g., menu buttons) displayed on the main screen 300b that are different from the concierge item 316b. For example, the textual message may state "Make Your Selection" to instruct a user 101 to select a menu item from the plurality of menu items (e.g., menu items 302b-312b) displayed on the screen. That is, the textual message of "Make Your Selection" does not provide the user 101 with guidance for how to operate (or interact with) the concierge item 316b, but only provides guidance for how a user 101 should operate (or interact with) the menu items 302b-312b.

Figure 3C:
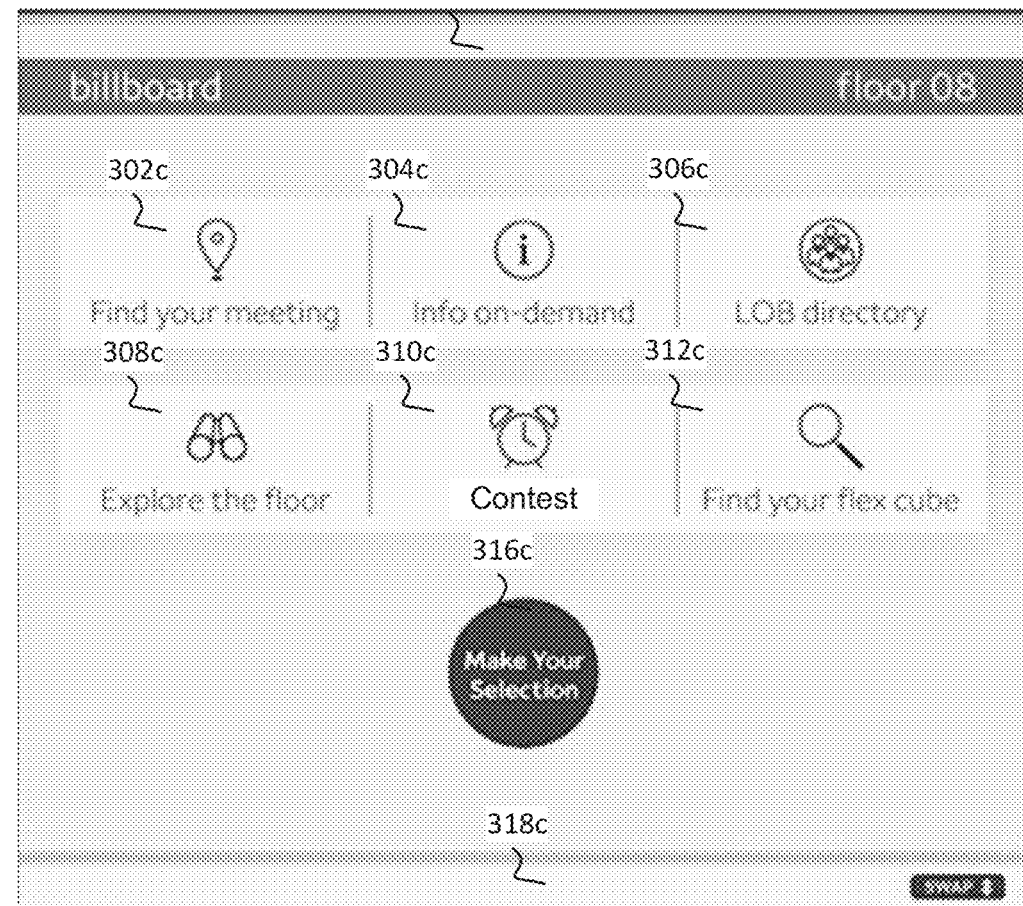
FIG. 3C is a screen capture depicting an example main screen including a concierge item in an animated state and an updated attract loop, wherein the main screen being displayed by an example billboard computing device of the environment in FIG. 1, according to some arrangements.

FIG. 3C is a screen capture depicting an example main screen including a concierge item in an animated state and an updated attract loop, wherein the main screen being displayed by an example billboard computing device of the environment in FIG. 1, according to some arrangements. The main screen 300c includes a first region 314c (e.g., the home screen) and a second region 318c (e.g., the attract loop). The first region 314c includes menu item 302c, 304c, 306c, 308c, 310c, and 312c. The second region 318c includes content item 320c. The first region 314c includes a concierge item 316c that is shown in an animated state as a two-dimensional object and containing a textual message.

Figure 4A:
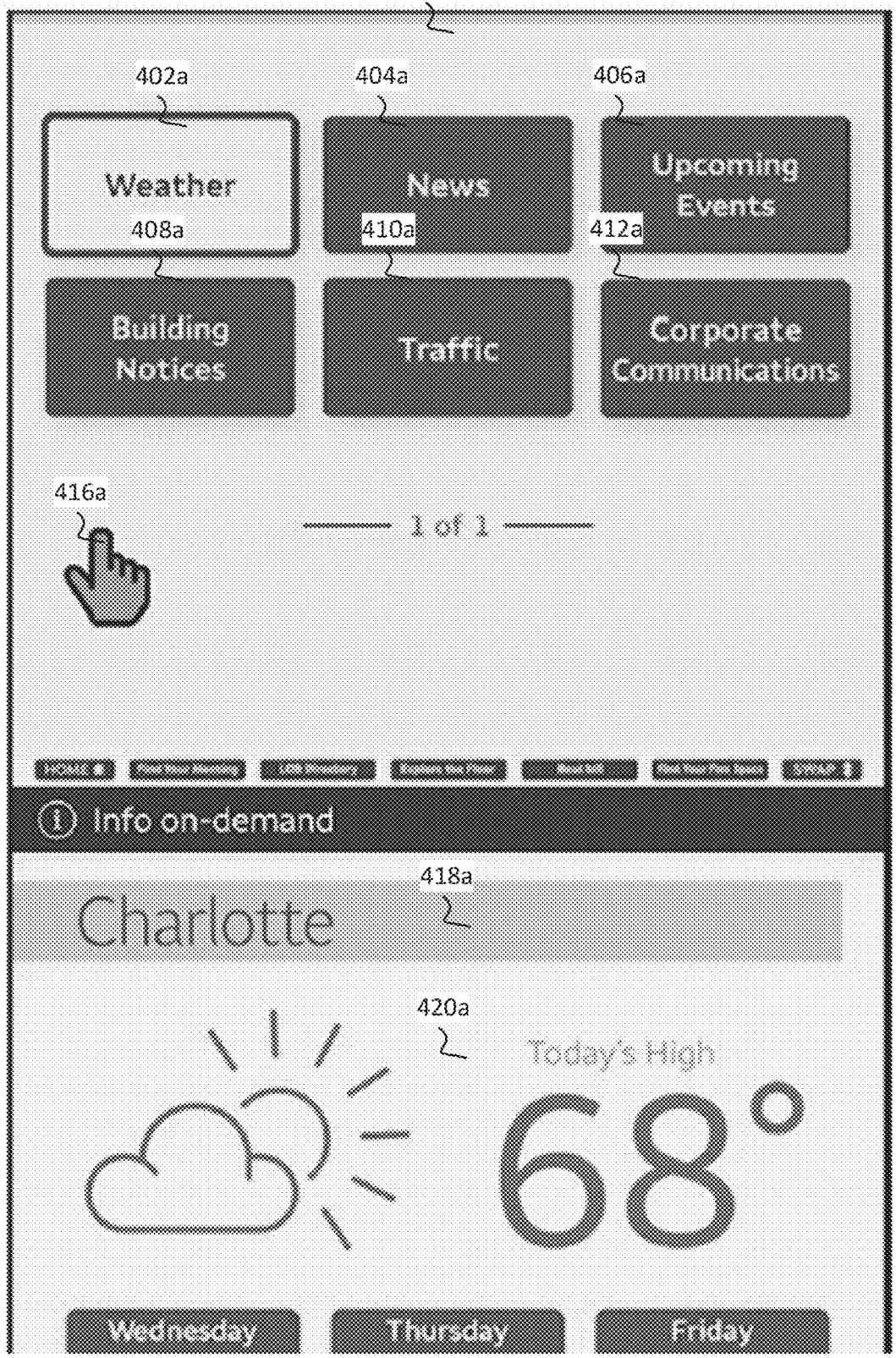
FIG. 4A is a screen capture depicting an example info on-demand screen being displayed by an example billboard computing device of the environment in FIG. 1, according to some arrangements.

FIG. 4A is a screen capture depicting an example info on-demand screen being displayed by an example billboard computing device of the environment in FIG. 1, according to some arrangements. The info on-demand screen 400a includes a first region 414a (e.g., the home screen) and a second region 418a (e.g., the attract loop). The first region 414a includes on-demand content item 432a, on-demand content item 434a, on-demand content item 436a, on-demand content item 438a, and on-demand content item 440a. The second region 418a includes content item 420a. The first region 414a includes a concierge item 416a that is shown in an animated state as a two-dimensional object.

Figure 4B:
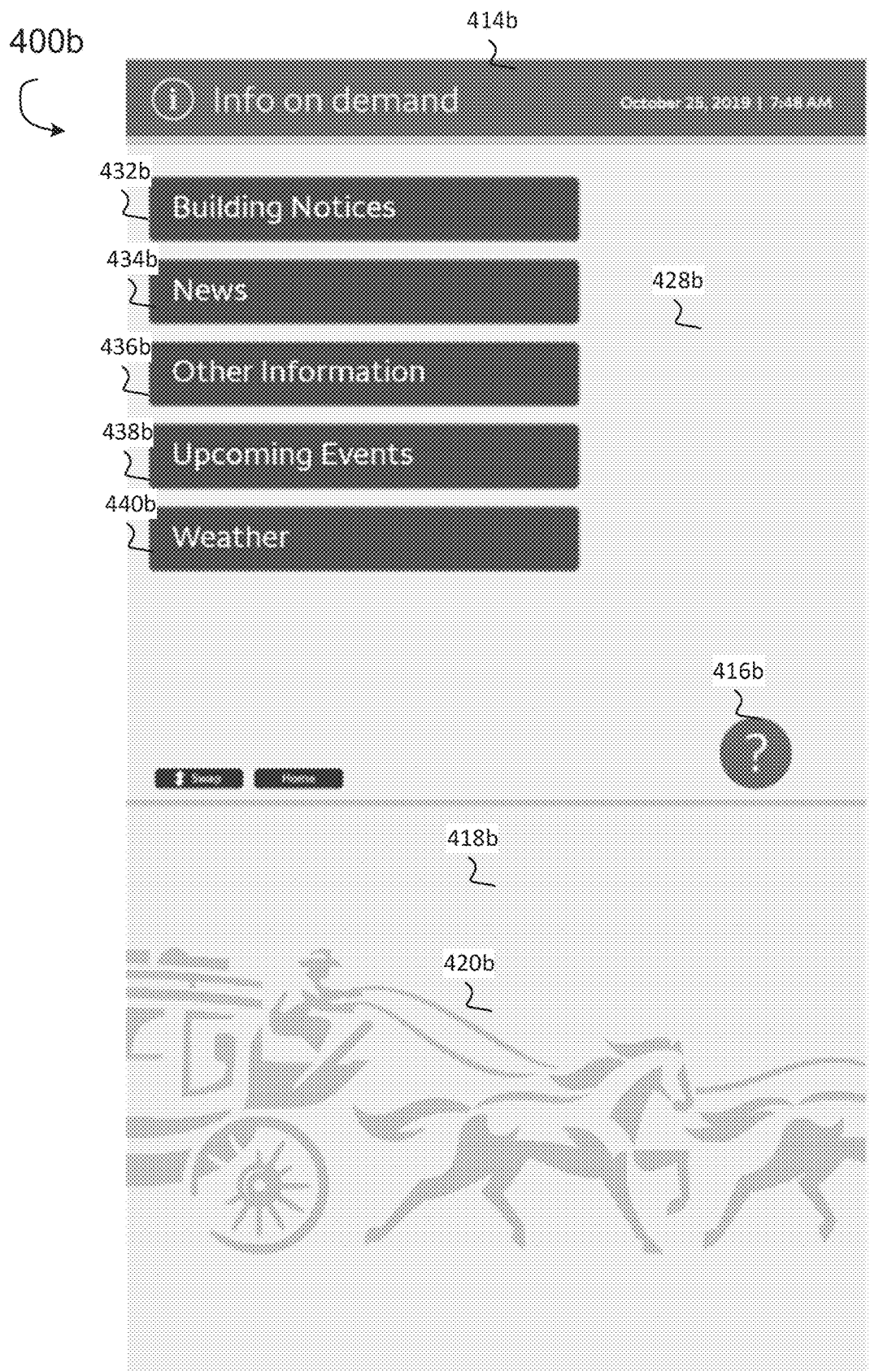
FIG. 4B is a screen capture depicting an example info on-demand screen including a concierge item in a static state, wherein the on-demand screen being displayed by an example billboard computing device of the environment in FIG. 1, according to some arrangements.

FIG. 4B is a screen capture depicting an example info on-demand screen including a concierge item in a static state, wherein the on-demand screen being displayed by an example billboard computing device of the environment in FIG. 1, according to some arrangements. The info on-demand screen 400b includes a first region 414b (e.g., the home screen) and a second region 418b (e.g., the attract loop). The first region 414b includes on-demand content item 432b, on-demand content item 434b, on-demand content item 436b, on-demand content item 438b, and on-demand content item 440b. The second region 418b includes content item 420b. The first region 414b includes a concierge item 416b that is shown as a static, two-dimensional object.

Figure 4C:
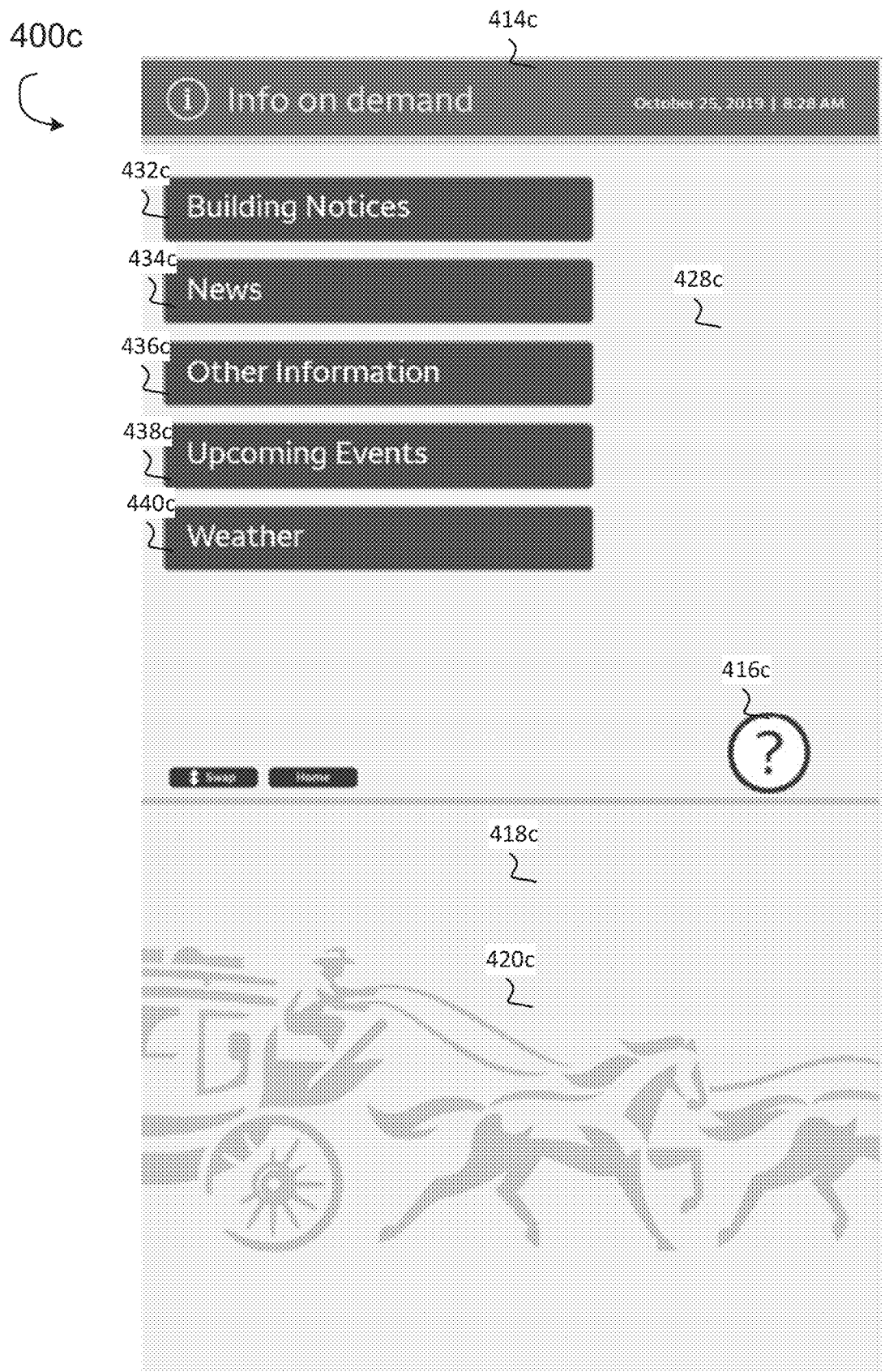
FIG. 4C is a screen capture depicting an example info on-demand screen including a concierge item in a static state, wherein the on-demand screen being displayed by an example billboard computing device of the environment in FIG. 1, according to some arrangements.

FIG. 4C is a screen capture depicting an example info on-demand screen including a concierge item in a static state, wherein the on-demand screen being displayed by an example billboard computing device of the environment in FIG. 1, according to some arrangements. The info on-demand screen 400c includes a first region 414c (e.g., the home screen) and a second region 418c (e.g., the attract loop). The first region 414c includes on-demand content item 432c, on-demand content item 434c, on-demand content item 436c, on-demand content item 438c, and on-demand content item 440c. The second region 418c includes content item 420c. The first region 414c includes a concierge item 416c that is shown as a static, two-dimensional object.

Figure 4D:
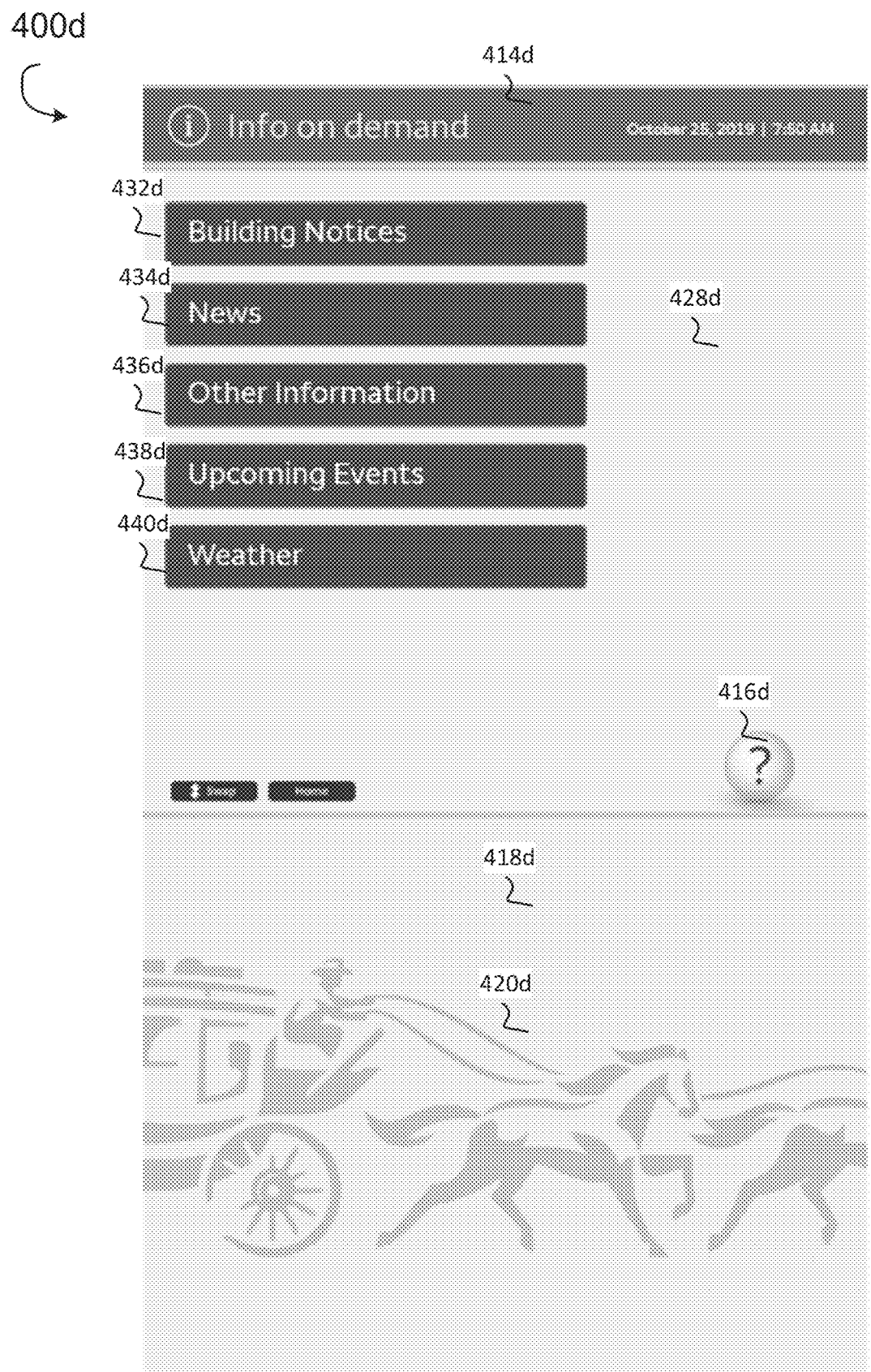
FIG. 4D is a screen capture depicting an example info on-demand screen including a concierge item in an animated state, wherein the on-demand screen being displayed by an example billboard computing device of the environment in FIG. 1, according to some arrangements.

FIG. 4D is a screen capture depicting an example info on-demand screen including a concierge item in an animated state, wherein the on-demand screen being displayed by an example billboard computing device of the environment in FIG. 1, according to some arrangements. The info on-demand screen 400d includes a first region 414d (e.g., the home screen) and a second region 418d (e.g., the attract loop). The first region 414d includes on-demand content item 432d, on-demand content item 434d, on-demand content item 436d, on-demand content item 438d, and on-demand content item 440d. The second region 418d includes content item 420d. The first region 414d includes a concierge item 416d that is shown as an animated, three-dimensional object.

As shown in FIG. 4D, the concierge item 416d may stay animated even when not providing information (e.g., messages, guidance, instructions, etc.) to the user 101. For example, the concierge item 416d stays animated when not providing information about any of the objects displayed on the current screen (e.g., the info on-demand screen 400d) and/or any other screen (e.g., main screen 300a in FIG. 3A, info on-demand screen 400a in FIG. 4A, etc.) associated with the billboard 118 in order to encourage the user 101 to interact/engage (or continue to interact/engage) with the billboard 118.

Figure 4E:
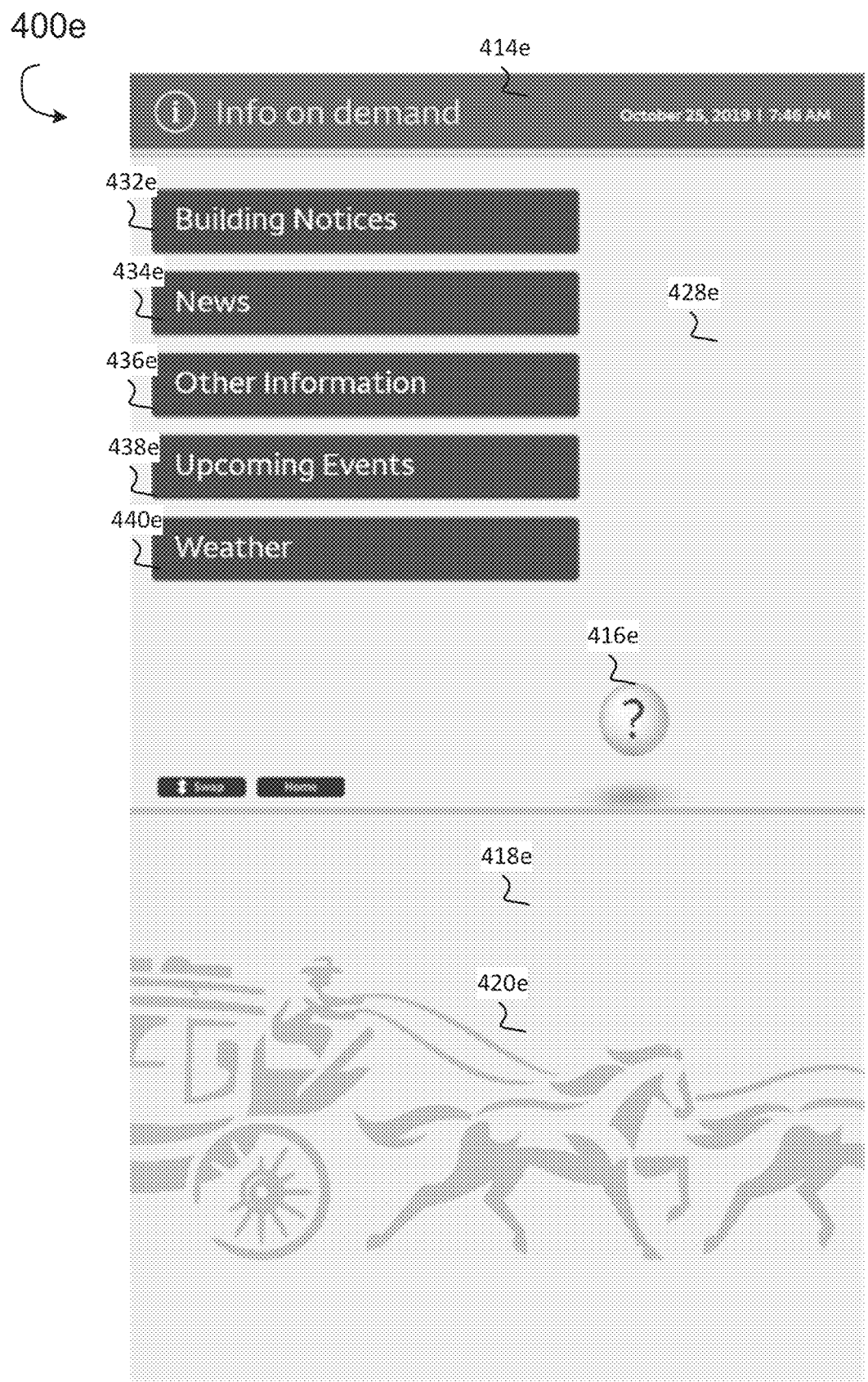
FIG. 4E is a screen capture depicting an example info on-demand screen including a concierge item in an animated state, wherein the on-demand screen being displayed by an example billboard computing device of the environment in FIG. 1, according to some arrangements.

FIG. 4E is a screen capture depicting an example info on-demand screen including a concierge item in an animated state, wherein the on-demand screen being displayed by an example billboard computing device of the environment in FIG. 1, according to some arrangements. The info on-demand screen 400e includes a first region 414e (e.g., the home screen) and a second region 418e (e.g., the attract loop). The first region 414e includes on-demand content item 432e, on-demand content item 434e, on-demand content item 436e, on-demand content item 438e, and on-demand content item 440e. The second region 418e includes content item 420e. The first region 414e includes a concierge item 416e that is shown as an animated, three-dimensional object having movement. Although the concierge item 416e is shown as a floating object, the concierge item 416e may have any movement such as flipping, twisting, bouncing, pinching, traversing across the screen, floating on the screen, overlapping a region of the screen, and overlapping a content item displayed on the screen.

Figure 4F:
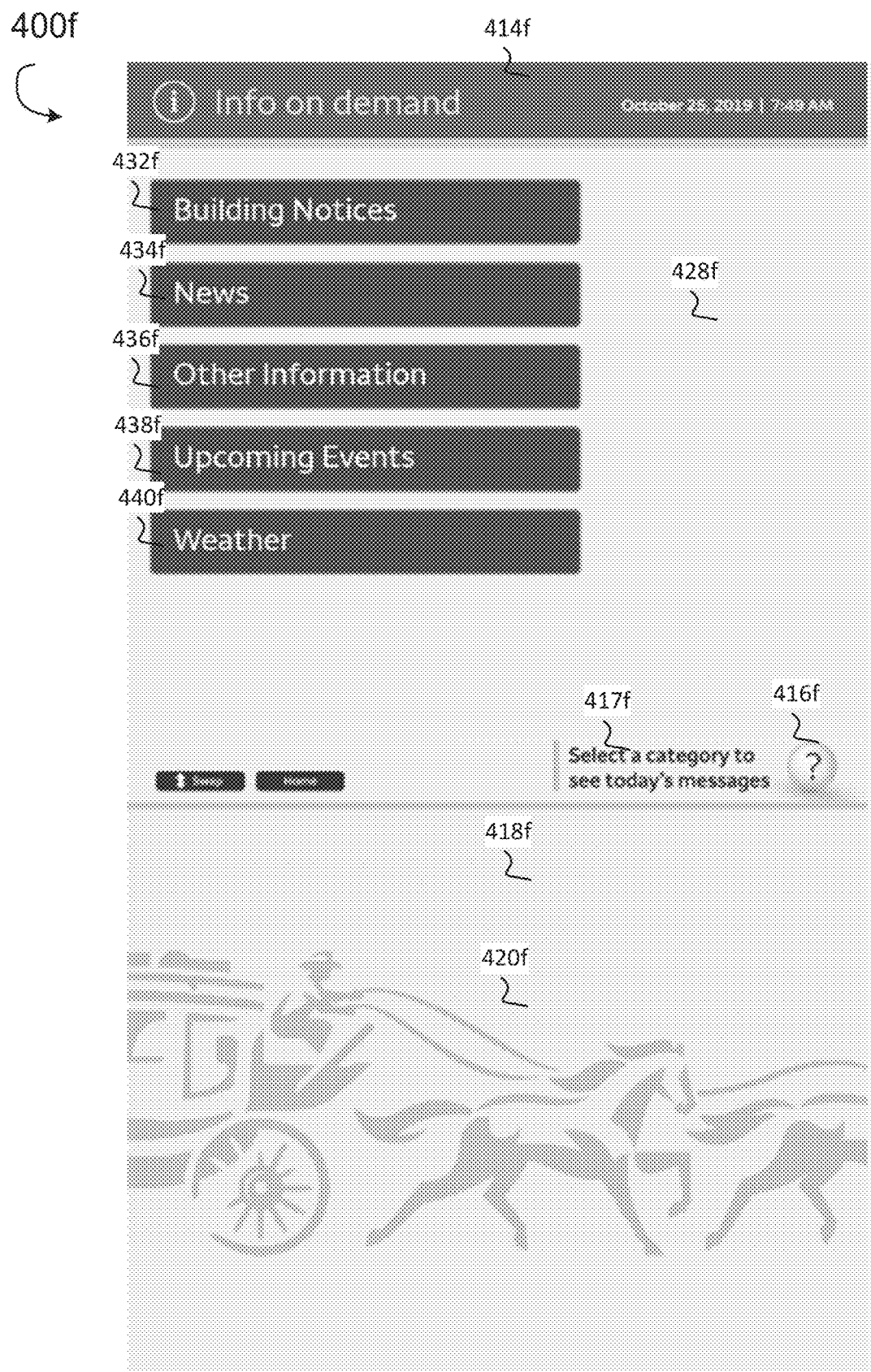
FIG. 4F is a screen capture depicting an example info on-demand screen including a concierge item in an animated state presenting messages, wherein the on-demand screen being displayed by an example billboard computing device of the environment in FIG. 1, according to some arrangements.

FIG. 4F is a screen capture depicting an example info on-demand screen including a concierge item in an animated state presenting messages, wherein the on-demand screen being displayed by an example billboard computing device of the environment in FIG. 1, according to some arrangements. The info on-demand screen 400f includes a first region 414f (e.g., the home screen) and a second region 418f (e.g., the attract loop). The first region 414f includes on-demand content item 432f, on-demand content item 434f, on-demand content item 436f, on-demand content item 438f, and on-demand content item 440f (collectively referred to as, on-demand content items 432f-440f). The second region 418f includes a content item 420f. Although the info on-demand screen 400f shows the content item 420f as a "default content item" (as discussed herein), the content item 420f may be a content item of any type. The first region 414f includes a concierge item 416f that is shown as an animated, three-dimensional object. The first region 414f includes a text message 417f that is shown adjacent to the concierge item 416f. In some arrangements, the subject matter of the text message 417 may be associated with one or all of the on-demand content items 432f-440f. For example, a text message 417f that is associated with the on-demand content item 440f may state, "Select the Weather button to see today's weather!" In some arrangements, the text message 417f may be positioned anywhere in the first region 414f relative to the position of the concierge item 416f, such as being above the concierge item 416f, below the concierge item 416f, touching the concierge item 416f, or overlapping the concierge item 416f.

As shown in FIG. 4F, the textual message 417f may provide information associated with one or more objects (e.g., on-demand content items 432f-440f) displayed on the main screen 400f that are different from the concierge item 416f. For example, the textual message may state "Select a category to see today's messages" to instruct a user 101 to select an on-demand content item from the plurality of on-demand content items (e.g., on-demand content items 432f-440f) displayed on the screen. That is, the textual message of "Make Your Selection" does not provide the user 101 with guidance for how to operate (or interact with) the concierge item 416f, but only provides guidance for how a user 101 should operate (or interact with) the on-demand content items 432f-440f.

Figure 4G:
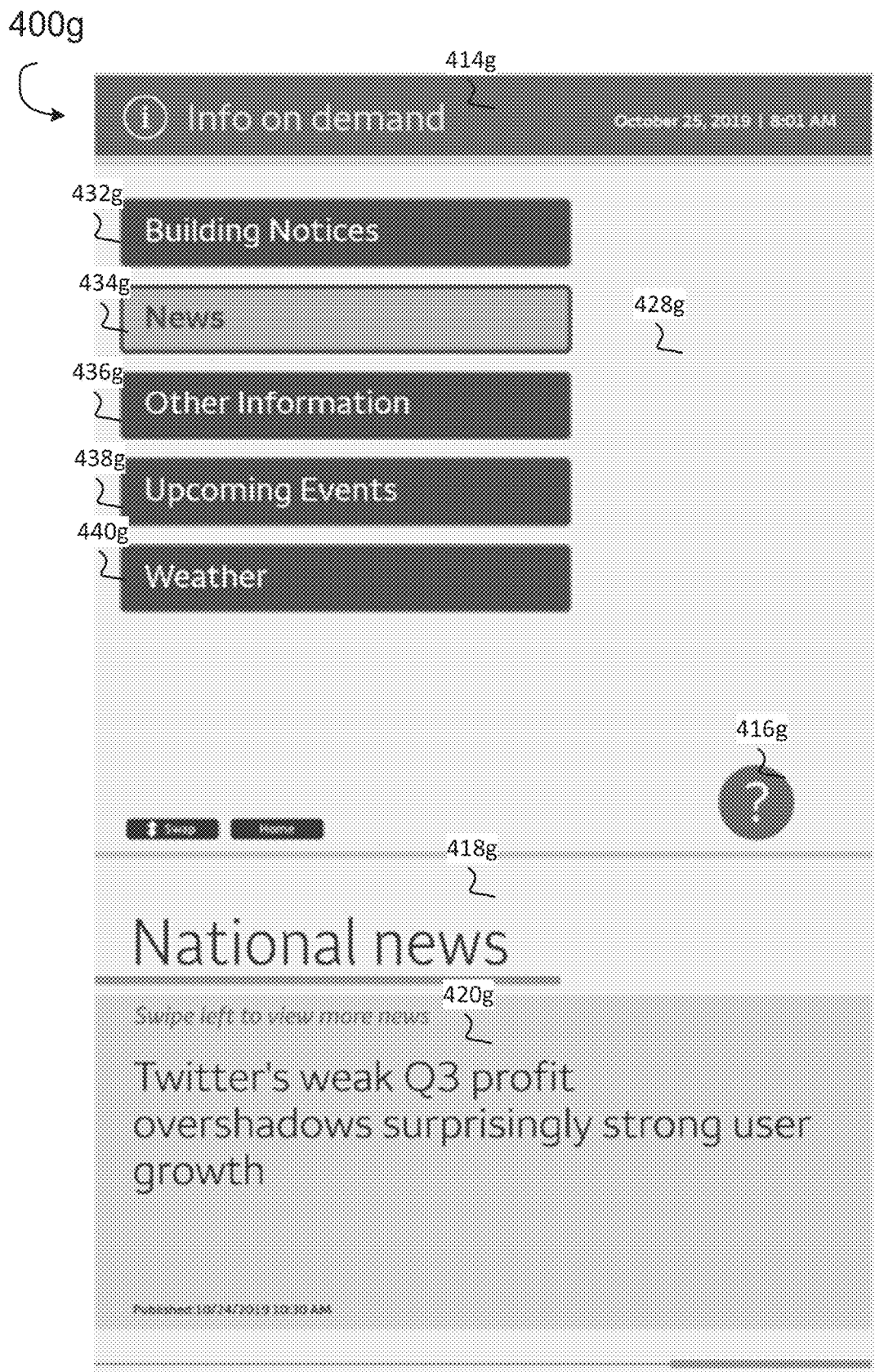
FIG. 4G is a screen capture depicting an example info on-demand screen including a concierge item in a static state and an updated attract loop, wherein the on-demand screen being displayed by an example billboard computing device of the environment in FIG. 1, according to some arrangements.

FIG. 4G is a screen capture depicting an example info on-demand screen including a concierge item in a static state and an updated attract loop, wherein the on-demand screen being displayed by an example billboard computing device of the environment in FIG. 1, according to some arrangements. The info on-demand screen 400g includes a first region 414g (e.g., the home screen) and a second region 418g (e.g., the attract loop). The first region 414g includes on-demand content item 432g, on-demand content item 434g, on-demand content item 436g, on-demand content item 438g, and on-demand content item 440g (collectively referred to as, on-demand content items 432g-440g). The second region 418g includes a content item 420f. The first region 414g includes a concierge item 416g that is shown as a static, two-dimensional object. The on-demand content item 434g is colored with a first color and the other on-demand content items (e.g., on-demand content items 432g, 436g, 438g, 440g) are colored with a second color, where the difference in coloring indicates that a user 101 has selected the on-demand content item 434g. In response to detecting that the user 101 has selected (or interacted with) the on-demand content item 400g, the billboard computing device 118 has inserted into the second region 418g a content item 420g of a particular subject matter that is associated with the on-demand content item 434g. For example, the billboard computing device 118 inserted a content item 420g, entitled "National news" into the second region 418g in response to detecting that a user 101 selected the on-demand content item 434g, entitled "News".

FIG. 5A is a screen capture depicting an example contest screen including a trivia content item and a concierge item in an animated state, wherein the contest screen being displayed by an example billboard computing device of the environment in FIG. 1, according to some arrangements. The contest screen 500a includes a first region 514a (e.g., the home screen) and a second region 518a (e.g., the attract loop). The first region 514a includes a trivia content item 550a that includes a question message 540a (e.g., "Question 1"). The trivia content item 550a includes a first answer option 552a (e.g., "Answer 1"), a second answer option 554a (e.g., "Answer 2"), a third answer option 556a (e.g., "Answer 3"), a fourth answer option 558a (e.g., "Answer 4"), and a fifth answer option 560a (e.g., "Answer 5"); collectively referred to herein as, "answer options 552a-560a". The subject matter of the answer options 552a-560a is related to the subject matter of the question message 540a in that they are potential answers to the question message 540a. The second region 518a includes a content item 520a. Although the on-demand screen 500a shows the content item 520a as a "default content item" (as discussed herein), the content item 520a may be a content item of any type. The first region 514a includes a concierge item 516c that is shown as an animated, three-dimensional object. A textual message 517a (e.g., "Let's Play Trivia! Press your answer") is shown in the first region 514a and the second region 518a. In some arrangements, the textual message 517a may be positioned in only the first region 514a or only the second region 518a.

As shown in FIG. 5A, the concierge item 516a may stay animated even when not providing information (e.g., messages, guidance, instructions, etc.) to the user 101. For example, the concierge item 516a stays animated when not providing information about any of the objects displayed on the current screen (e.g., the contest screen 500d) and/or any other screen (e.g., main screen 300a in FIG. 3A, info on-demand screen 400a in FIG. 4A, etc.) associated with the billboard 118 in order to encourage the user 101 to interact/engage (or continue to interact/engage) with the billboard 118.

FIG. 5B is a screen capture depicting an example contest screen including an indication that a user selected an answer option from the trivia content item and a concierge item in an animated state, wherein the contest screen being displayed by an example billboard computing device of the environment in FIG. 1, according to some arrangements. The contest screen 500b includes a first region 514b (e.g., the home screen) and a second region 518b (e.g., the attract loop). The first region 514b includes a trivia content item 550b that includes a question message 540b (e.g., "Question 1"). The trivia content item 550b includes a first answer option 552b (e.g., "Answer 1"), a second answer option 554b (e.g., "Answer 2"), a third answer option 556b (e.g., "Answer 3"), a fourth answer option 558b (e.g., "Answer 4"), and a fifth answer option 560b (e.g., "Answer 5"); collectively referred to herein as, "answer options 552b-560b"). The subject matter of the answer options 552b-560b is related to the subject matter of the question message 540b in that they are potential answers to the question message 540b. The second region 518b includes a content item 520b. Although the on-demand screen 500b shows the content item 520b as a "default content item" (as discussed herein), the content item 520b may be a content item of any type. The first region 514b includes a concierge item 516b that is shown as an animated, three-dimensional object. The first region 514b includes a hand icon 530b indicating that a user 101 has selected the third answer option 556b (e.g., "Answer 3").

FIG. 5C is a screen capture depicting an example contest screen including a concierge item in an animated state and a removal of one or more unselected answer options from the contest screen, wherein the contest screen being displayed by an example billboard computing device of the environment in FIG. 1, according to some arrangements. The contest screen 500c includes a first region 514c (e.g., the home screen) and a second region 518c (e.g., the attract loop). The first region 514c includes a trivia content item 550c that includes a question message 540c (e.g., "Question 1"). The trivia content item 550c includes a third answer option 556c (e.g., "Answer 3"). The second region 518c includes a content item 520c. Although the on-demand screen 500c shows the content item 520c as a "default content item" (as discussed herein), the content item 520c may be a content item of any type. The first region 514c includes a concierge item 516c that is shown as an animated, three-dimensional object. The first region 514c includes a symbol 560c indicating that a user 101 has selected the third answer option 556c and that the billboard computing device 118, responsive to the selection, is removing the other unselected answers options from the first region 514c. In various examples, the symbol 560c may be an additional animation that appears in response to selection of an incorrect answer, or in other examples, in response to selection of a correct answer. For instance, the symbol 560c may appear as a pop-up animation, such as confetti. In other examples, the symbol 560c may be a different type of animation, such as a pop-up image.

FIG. 5D is a screen capture depicting an example contest screen including an indication that a user selected an incorrect answer option to the question, wherein the contest screen being displayed by an example billboard computing device of the environment in FIG. 1, according to some arrangements. The contest screen 500d includes a first region 514d (e.g., the home screen) and a second region 518d (e.g., the attract loop). The first region 514d includes a first content item 550d with a textual message (e.g., "Your answer is incorrect") indicating that the user 101 selected an incorrect answer option. The second region 518d includes a content item 520d. Although the on-demand screen 500d shows the content item 520d as a "default content item" (as discussed herein), the content item 520d may be a content item of any type.

Figure 5E:
FIG. 5E is a screen capture depicting an example contest screen including an indication that a user selected an answer option from the trivia content item and a concierge item in an animated state, wherein the contest screen being displayed by an example billboard computing device of the environment in FIG. 1, according to some arrangements.

FIG. 5E is a screen capture depicting an example contest screen including an indication that a user selected an answer option from the trivia content item and a concierge item in an animated state, wherein the contest screen being displayed by an example billboard computing device of the environment in FIG. 1, according to some arrangements. The contest screen 500e includes a first region 514e (e.g., the home screen) and a second region 518e (e.g., the attract loop). The first region 514e includes a trivia content item 550e that includes a question message 540e (e.g., "Question 1"). The trivia content item 550e includes a first answer option 552e (e.g., "Answer 1"), a second answer option 554e (e.g., "Answer 2"), a third answer option 556e (e.g., "Answer 3"), a fourth answer option 558e (e.g., "Answer 4"), and a fifth answer option 560e (e.g., "Answer 5"); collectively referred to herein as, "answer options 552e-560e". The subject matter of the answer options 552e-560e is related to the subject matter of the question message 540e in that they are potential answers to the question message 540e. The second region 518e includes a content item 520e. Although the on-demand screen 500e shows the content item 520e as a "default content item" (as discussed herein), the content item 520e may be a content item of any type. The first region 514e includes a concierge item 516e that is shown as an animated, three-dimensional object. The first region 514e includes a hand icon 530e indicating that a user 101 has selected the third answer option 556e (e.g., "Answer 3").

Figure 5F:
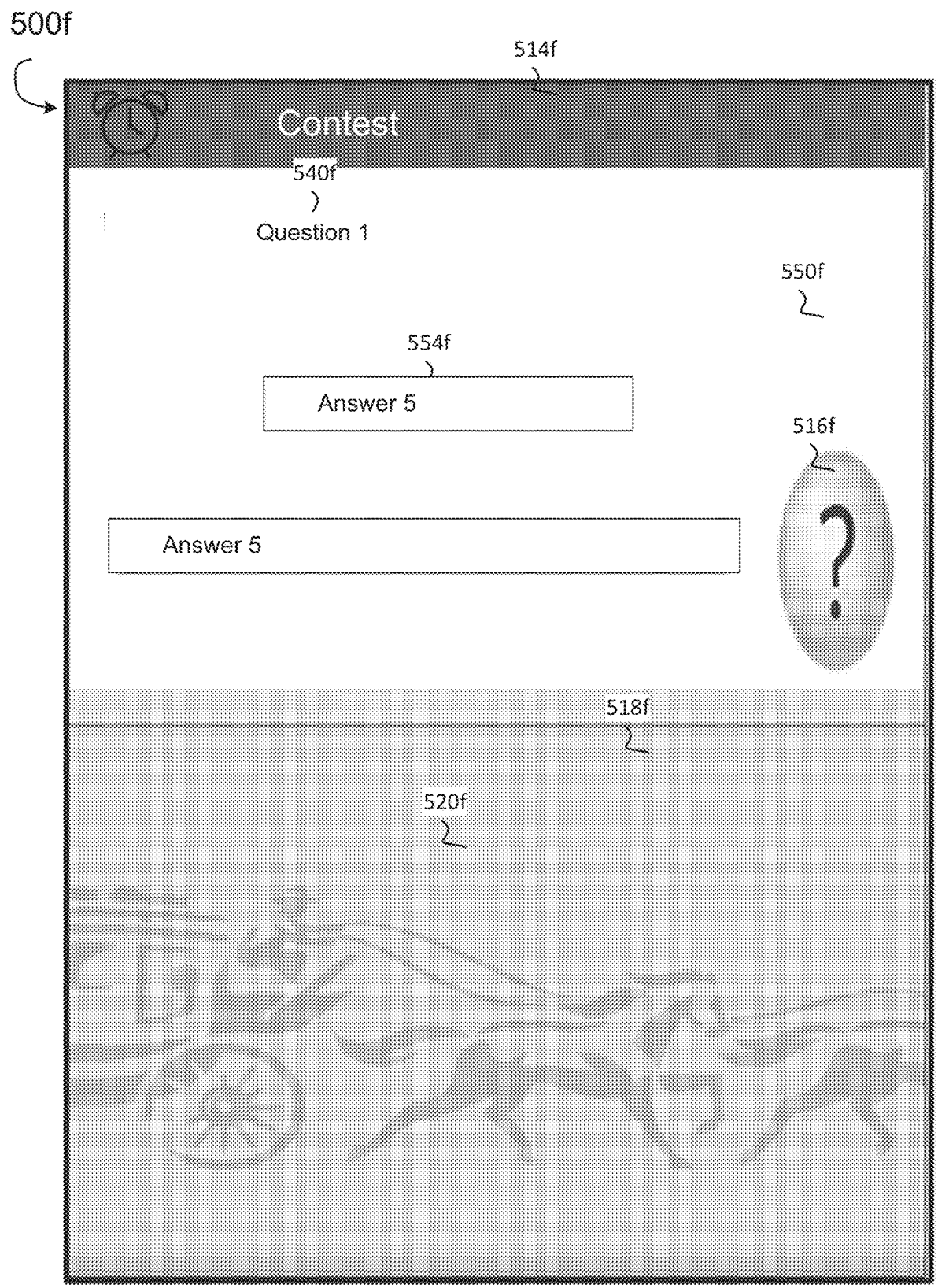
FIG. 5F is a screen capture depicting an example contest screen including a concierge item in an animated state and a removal of one or more unselected answer options from the contest screen, wherein the contest screen being displayed by an example billboard computing device of the environment in FIG. 1, according to some arrangements.

FIG. 5F is a screen capture depicting an example contest screen including a concierge item in an animated state and a removal of one or more unselected answer options from the contest screen, wherein the contest screen being displayed by an example billboard computing device of the environment in FIG. 1, according to some arrangements. The contest screen 500f includes a first region 514f (e.g., the home screen) and a second region 518f (e.g., the attract loop). The first region 514f includes a trivia content item 550f that includes a question message 540f (e.g., "Question 1"). The trivia content item 550f includes a fifth answer option 556f (e.g., "Answer 5"). The second region 518f includes a content item 520f. Although the on-demand screen 500f shows the content item 520f as a "default content item" (as discussed herein), the content item 520f may be a content item of any type. The first region 514f includes a concierge item 516f that is shown as an animated, three-dimensional object.

Figure 5G:
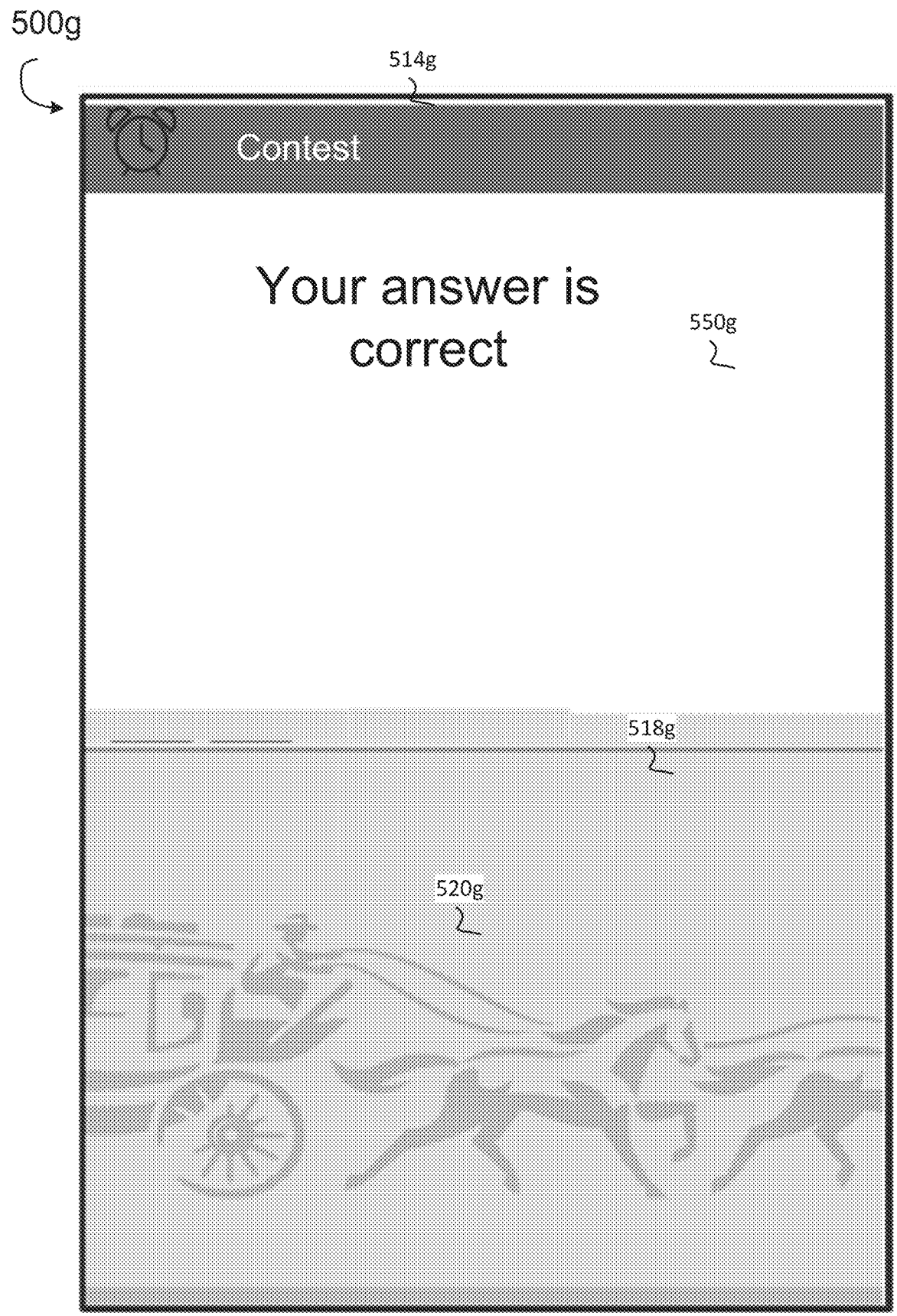
FIG. 5G is a screen capture depicting an example contest screen including an indication that a user selected a correct answer option to the question, wherein the contest screen being displayed by an example billboard computing device of the environment in FIG. 1, according to some arrangements.
Figure 5H:
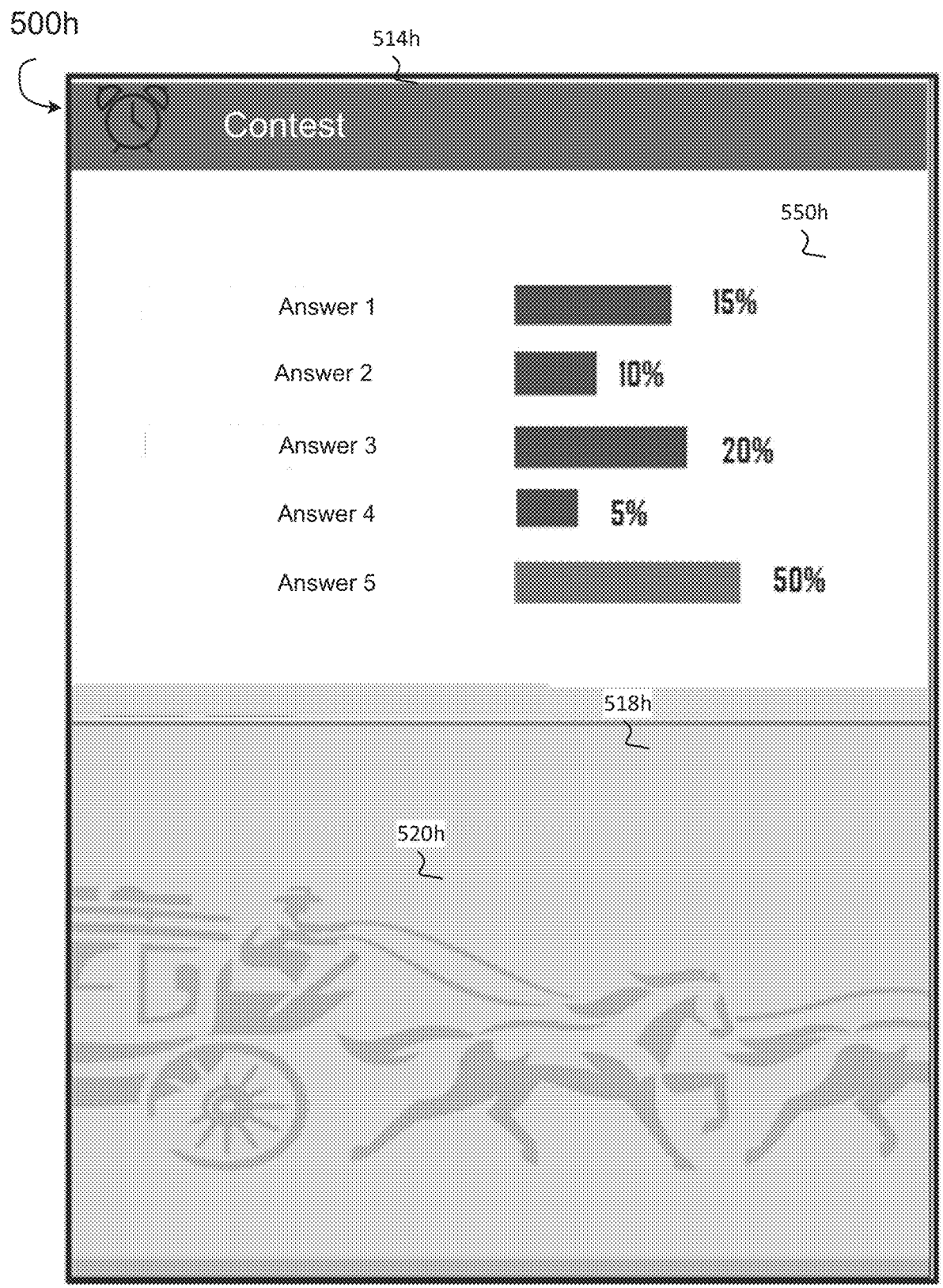
FIG. 5H is a screen capture depicting an example contest screen including a scoreboard of the scores achieved by a plurality of users in the same building, wherein the contest screen being displayed by an example billboard computing device of the environment in FIG. 1, according to some arrangements.

FIG. 5G is a screen capture depicting an example contest screen including an indication that a user selected a correct answer option to the question, wherein the contest screen being displayed by an example billboard computing device of the environment in FIG. 1, according to some arrangements. The contest screen 500g includes a first region 514g (e.g., the home screen) and a second region 518g (e.g., the attract loop). The first region 514g includes a first content item 550g with a textual message (e.g., "Your answer is correct") indicating that the user 101 selected the correct answer option. The second region 518g includes a content item 520g. Although the on-demand screen 500g shows the content item 520g as a "default content item" (as discussed herein), the content item 520g may be a content item of any type.

FIG. 5H is a screen capture depicting an example contest screen including a scoreboard of the scores achieved by a plurality of users in the same building, wherein the contest screen being displayed by an example billboard computing device of the environment in FIG. 1, according to some arrangements. The contest screen 500h includes a first region 514h (e.g., the home screen) and a second region 518h (e.g., the attract loop). The first region 514h includes a first content item 550h with a plurality of percentages and the plurality of answer options (e.g., "Answer 1", "Answer 2", "Answer 3", "Answer 4", "Answer 5"). Each percentage of the plurality of percentages indicates a number of users who selected a respective answer option of the plurality of answer options responsive to viewing the question being displayed on the screen. The second region 518h includes a content item 520h. Although the on-demand screen 500h shows the content item 520h as a "default content item" (as discussed herein), the content item 520h may be a content item of any type. While illustrated in FIG. 5H as a plurality of percentages, in various other examples the first content item 550h may include a different representation of the distribution of completed answers. For instance, the first content item 550h may include a pie chart, a line chart, or any different type of graphical visualization of the distribution of answers. In some examples, instead of percentages, the volume of answers may be illustrated.

Figure 6A:
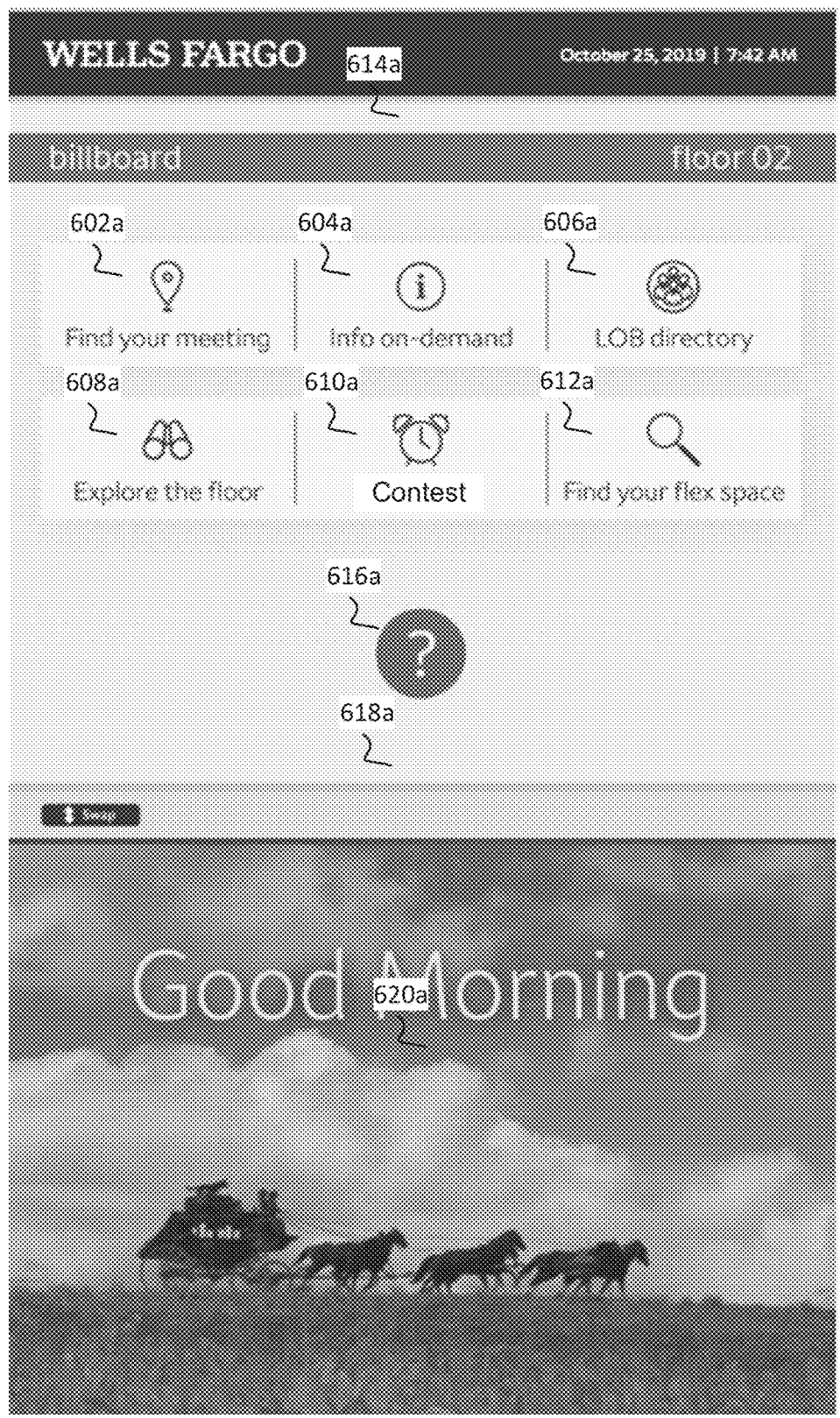
FIG. 6A is a screen capture depicting an example main screen including a concierge item in a static state and an updated attract loop, wherein the main screen being displayed by an example billboard computing device of the environment in FIG. 1, according to some arrangements.

FIG. 6A is a screen capture depicting an example main screen including a concierge item in a static state and an updated attract loop, wherein the main screen being displayed by an example billboard computing device of the environment in FIG. 1, according to some arrangements. The main screen 600a includes a first region 614a (also referred to herein as, "the home screen") and a second region 618a (also referred to herein as, "the attract loop"). The first region 614a allows a user 101 to know the list of features that are available for selection. As shown, the first region 614a includes menu item 602a, 604a, 606a, 608a, 610a, and 612a (collectively referred to herein as, menu items 602a-612a). In response to a user selecting menu item 602a, which is entitled "Find your meeting", the billboard computing device 118 gathers information (e.g., meeting location, meeting room, meeting time, etc.) about a meeting associated with the user 101 and displays the information on the screen. In response to a user selecting menu item 604a, which is entitled "Info on-demand", the billboard computing device 118 redraws the main screen 600a as any of the screens shown in FIG. 4A-4F for the user 101 to select from a plurality of on-demand options. In response to a user selecting menu item 606a, which is entitled "LOB directory", the billboard computing device 118 displays a lobby directory on the screen. In response to a user selecting menu item 608d, which is entitled "Explore the floor", the billboard computing device 118 displays information about the building where the billboard computing device 118 is located to assist a user 101 in navigating through the building. In response to a user selecting menu item 610a, which is entitled "Contest", the billboard computing device 118 enters the gamification mode, as shown in FIG. 5A. In response to a user selecting menu item 612a, which is entitled "Find your flex cube", the billboard computing device 118 will find the flex cube associated or assigned to the user 101.

The billboard computing device 118 inserts a content item 620a in the second region 318a or "attract loop" responsive to an interaction by the user 101 with the screen 230B. In some arrangements, the billboard computing device 118 cycles (e.g., replaces, refreshes, updates, etc.) between different content items (e.g., weather, news, an introduction or welcome page, etc.) on a periodic basis (e.g., every minute, every hour, every day, every month, etc.). In some arrangements, the billboard computing device 118 may swap (e.g., interchange, trade, etc.) the display locations of the first region 614a (e.g., "the home screen") and the second region 618a (e.g., "the attract loop"). For example, the billboard computing device 118 may draw the second region 618a on the top of the screen and the first region 614a on the bottom of the screen.

The first region 614a includes a concierge item 616a that is shown as a static, two-dimensional object.

Figure 6B:
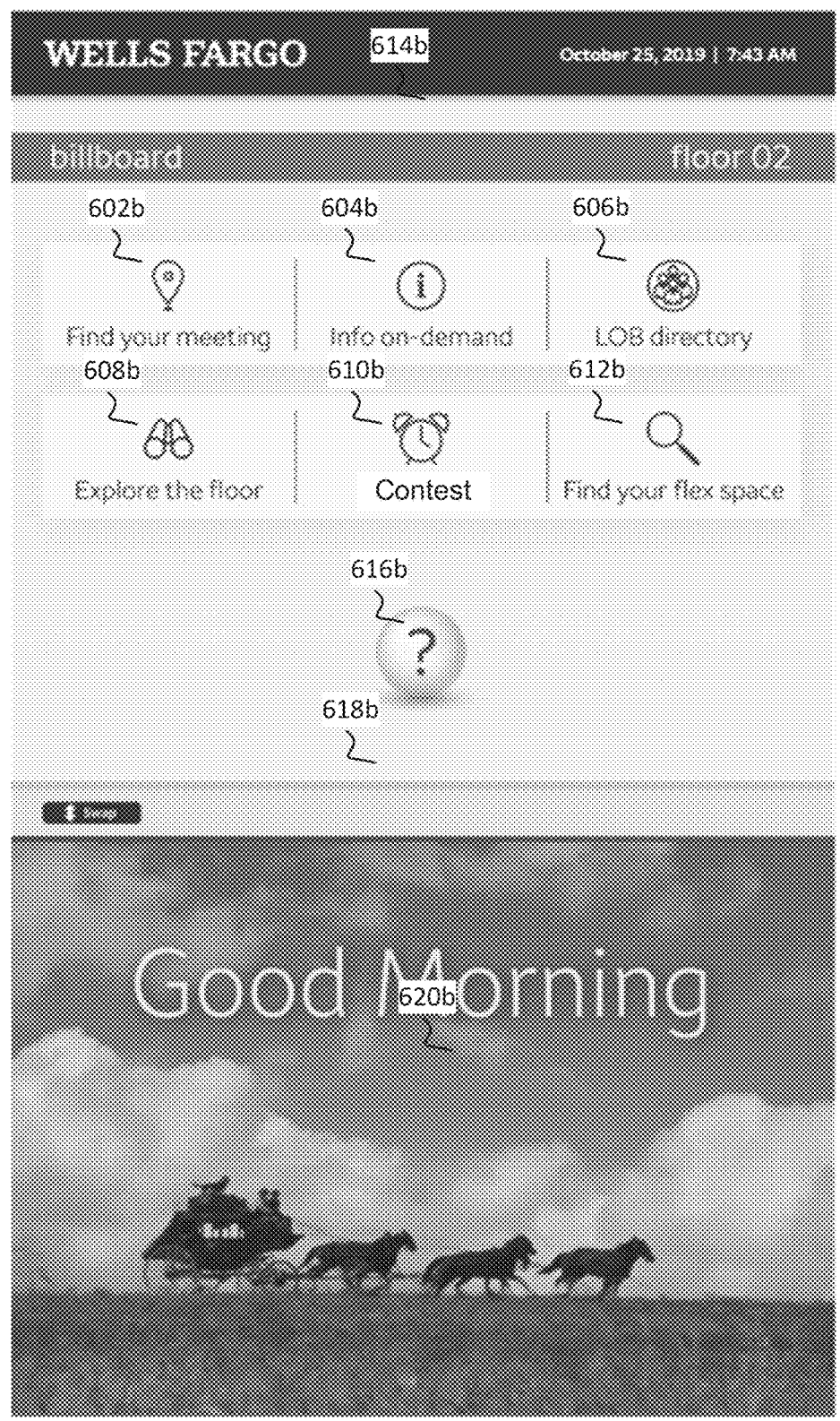
FIG. 6B is a screen capture depicting an example main screen including a concierge item in an animated state and an updated attract loop, wherein the main screen being displayed by an example billboard computing device of the environment in FIG. 1, according to some arrangements.

FIG. 6B is a screen capture depicting an example main screen including a concierge item in an animated state and an updated attract loop, wherein the main screen being displayed by an example billboard computing device of the environment in FIG. 1, according to some arrangements. The main screen 600b includes a first region 614b (e.g., the home screen) and a second region 618b (e.g., the attract loop). The first region 614b includes menu item 602b, 604b, 606b, 608b, 610b, and 612b. The second region 618b includes content item 620b. The first region 614b includes a concierge item 616b that is shown as an animated, three-dimensional object.

As shown in FIG. 6B, the concierge item 616b may stay animated even when not providing information (e.g., messages, guidance, instructions, etc.) to the user 101. For example, the concierge item 616b stays animated when not providing information about any of the objects displayed on the current screen (e.g., the main screen 600b) and/or any other screen (e.g., main screen 300a in FIG. 3A, info on-demand screen 400a in FIG. 4A, etc.) associated with the billboard 118 in order to encourage the user 101 to interact/engage (or continue to interact/engage) with the billboard 118.

Figure 6C:
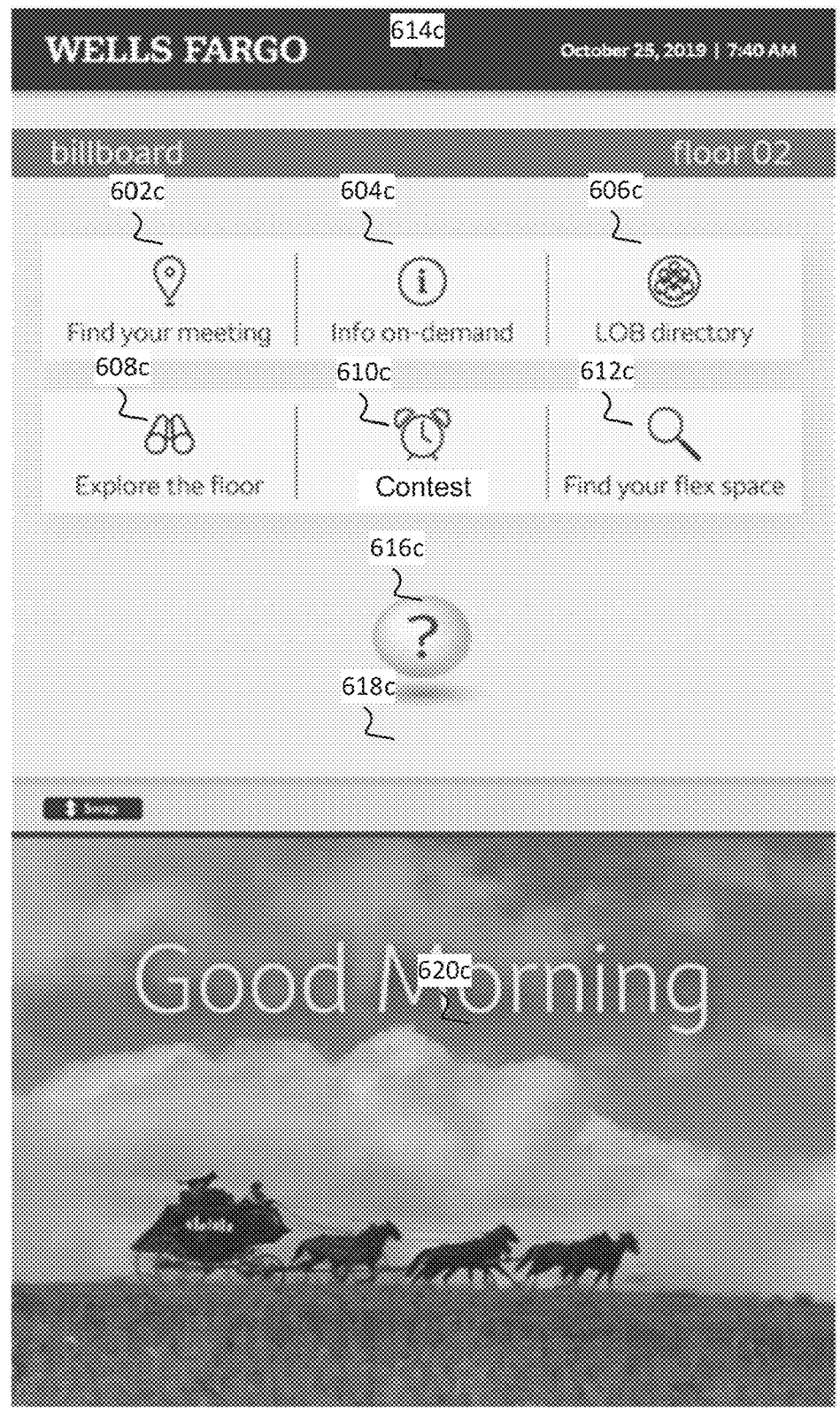
FIG. 6C is a screen capture depicting an example main screen including a concierge item in an animated state and an updated attract loop, wherein the main screen being displayed by an example billboard computing device of the environment in FIG. 1, according to some arrangements.

FIG. 6C is a screen capture depicting an example main screen including a concierge item in an animated state and an updated attract loop, wherein the main screen being displayed by an example billboard computing device of the environment in FIG. 1, according to some arrangements. The main screen 600c includes a first region 614c (e.g., the home screen) and a second region 618c (e.g., the attract loop). The first region 614c includes menu items 602c, 604c, 606c, 608c, 610c, and 612c. The second region 618c includes content item 620c. The first region 614c includes a concierge item 616c that is shown as an animated, three-dimensional object having movement. Although the concierge item 616c is shown as a floating object, the concierge item 616c may have any movement such as flipping, twisting, bouncing, pinching, traversing across the screen, floating on the screen, overlapping a region of the screen, and overlapping a content item displayed on the screen.

Figure 6D:
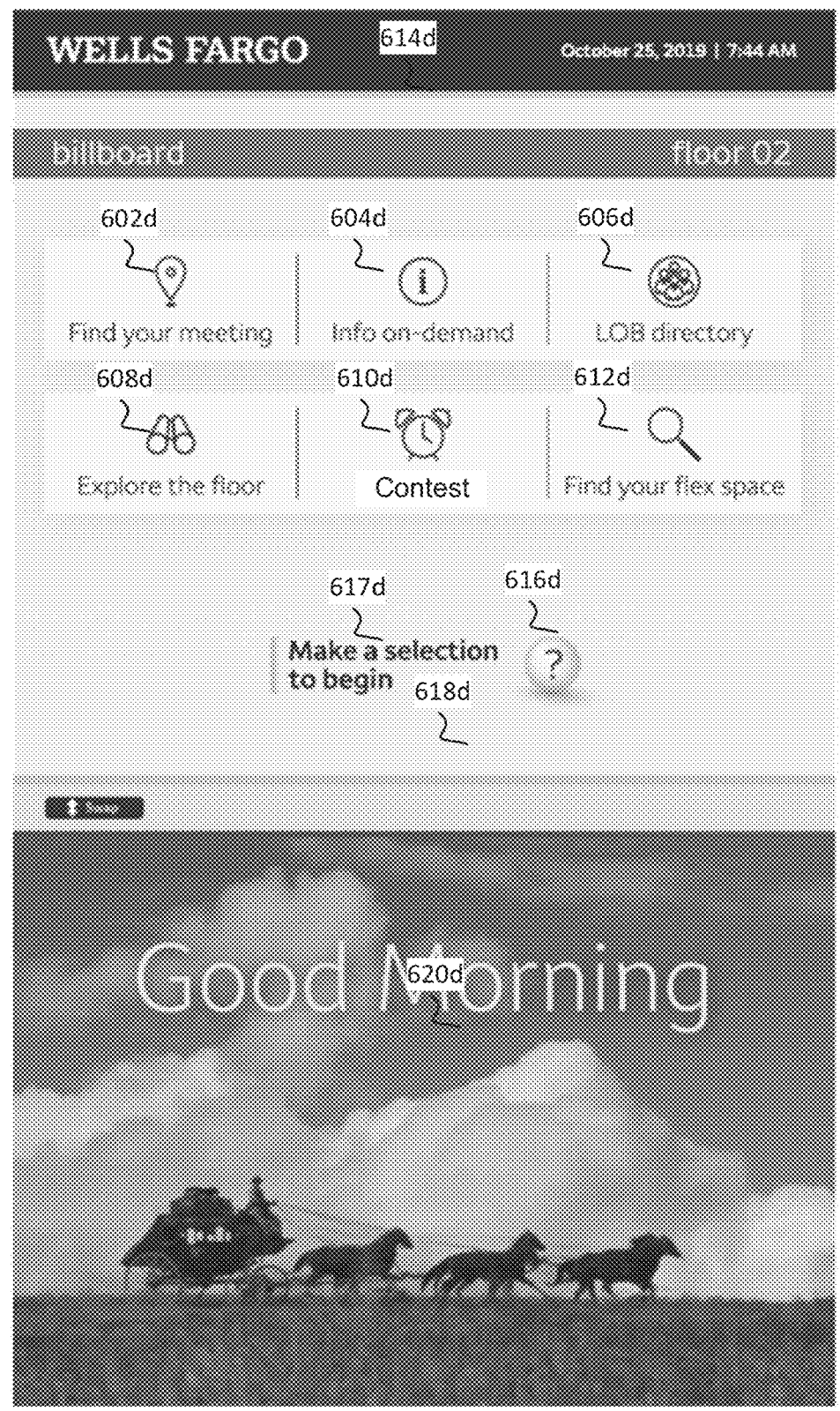
FIG. 6D is a screen capture depicting an example info on-demand screen including a concierge item in an animated state presenting messages, wherein the on-demand screen being displayed by an example billboard computing device of the environment in FIG. 1, according to some arrangements.

FIG. 6D is a screen capture depicting an example info on-demand screen including a concierge item in an animated state presenting messages, wherein the on-demand screen being displayed by an example billboard computing device of the environment in FIG. 1, according to some arrangements. The main screen 600d includes a first region 614d (e.g., the home screen) and a second region 618d (e.g., the attract loop). The first region 614d includes menu items 602d, 604d, 606d, 608d, 610d, and 612d. The second region 618d includes content item 620d. The first region 614d includes a concierge item 616d that is shown as an animated, three-dimensional object. The first region 614f includes a text message 617d that is shown adjacent to the concierge item 616d. In some arrangements, the subject matter of the text message 617d may be associated with one or more of the menu items 602d-612d. For example, a textual message 617d that is associated with all of the menu item may state, "Make a selection to begin". In some arrangements, the text message 617d may be positioned anywhere in the first region 614d relative to the position of the concierge item 616d, such as being above the concierge item 616d, below the concierge item 616d, touching the concierge item 616d, or overlapping the concierge item 616d.

As shown in FIG. 6D, the textual message 617f may provide information associated with one or more objects (e.g., menu items 602d-612d) displayed on the main screen 600d that are different from the concierge item 616d, in that the textual message 617f is not associated with the concierge item 616d. For example, the textual message 617f of "Make a selection to begin" is associated with the menu items 602d-612d because it instructs the user 101 to select one of the menu items, without referencing or indicating the concierge item 616d in the textual message 617f. That is, the textual message of "Make a selection to begin" does not provide the user 101 with guidance for how to operate (or interact with) the concierge item 616b, but only provides guidance for how a user 101 should operate (or interact with) the menu items 602d-612d.

Although shown in a particular color arrangement, any of the features (e.g., borders, frames, content items, buttons, text font, etc.) shown in any of the screen captures of FIGS. 3A-6D may be colored using any color pattern to encourage the user 101 to interact with the billboard computing device 118.

Figure 7:
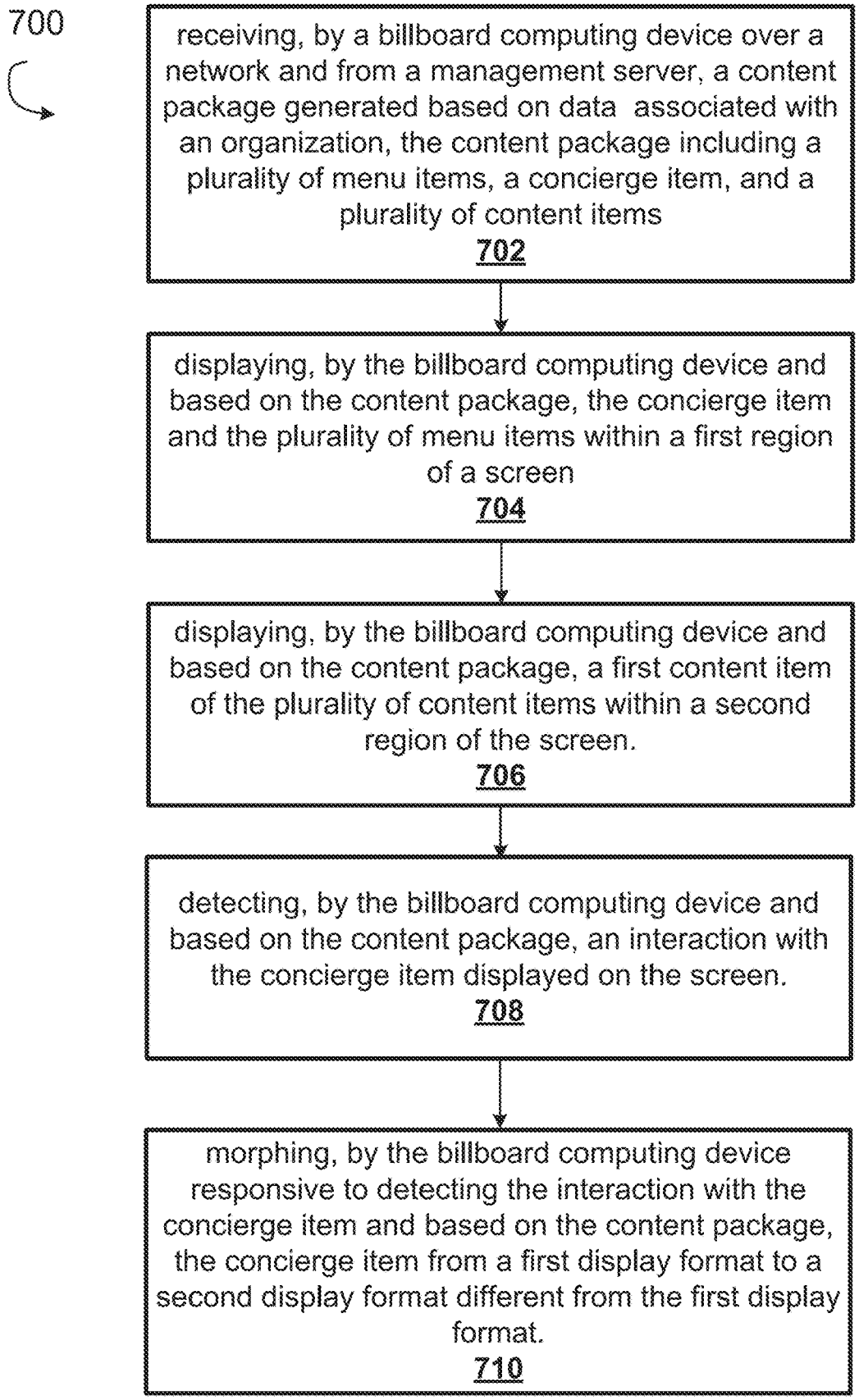
FIG. 7 is a flow diagram depicting a method for providing interactive guidance to a user via a billboard computing device for navigating a workplace, according to some arrangements.

FIG. 7 is a flow diagram depicting a method for providing interactive guidance to a user via a billboard computing device for navigating a workplace, according to some arrangements. Additional, fewer, or different operations may be performed in the method depending on the particular arrangement. In some arrangements, some or all operations of method 700 may be performed by one or more processors executing on one or more computing devices, systems, or servers. In some arrangements, method 700 may be performed by one or more billboards, such as billboard computing device 118 in FIG. 1. In some arrangements, some or all operations of method 700 may be performed by one or more billboard management servers, such as billboard management server 104 in FIG. 1. Each operation may be re-ordered, added, removed, or repeated.

As shown in FIG. 7, the method 700 includes the operation 702 of receiving, by a billboard computing device over a network and from a management server, a content package generated based on data associated with an organization, the content package including a plurality of menu items, a concierge item, and a plurality of content items. The method also includes the operation 704 of displaying, by the billboard computing device and based on the content package, the concierge item and the plurality of menu items within a first region of a screen. The method also includes the operation 706 of displaying, by the billboard computing device and based on the content package, a first content item of the plurality of content items within a second region of the screen. The method also includes the operation 708 of detecting, by the billboard computing device and based on the content package, an interaction with the concierge item displayed on the screen. The method also includes the operation 710 of morphing, by the billboard computing device responsive to detecting the interaction with the concierge item and based on the content package, the concierge item from a first display format to a second display format different from the first display format.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A system comprising:
one or more processors; and
one or more computer-readable storage mediums storing instructions that, when executed by the one or more processors, cause the one or more processors to:
receive, over a network and from a server, a content package generated based on data associated with an organization, the content package including a plurality of menu items, a concierge item, and a plurality of content items, wherein the plurality of content items includes a first content item;
display, by a billboard computing device and based on the content package, the concierge item and the plurality of menu items within a first region of a screen of the billboard computing device;
display, by the billboard computing device and based on the content package, the first content item of the plurality of content items within a second region of the screen;
replace, by the billboard computing device, the first content item displayed within the second region of the screen with a different content item of the plurality of content items while maintaining the concierge item and the plurality of menu items within the first region;
detect an interaction with a menu item of the plurality of menu items;
morph, based on detecting the interaction with the menu item, the concierge item from a first display format to a second display format different from the first display format based on the content package; and
display a message within the second region of the screen based on the interaction with the menu item, the message being related to the menu item and unrelated to another menu item of the plurality of menu items;
wherein the billboard computing device displays the concierge item of the first display format on the screen as a static object, wherein the billboard computing device displays the concierge item of the second display format on the screen as an animated object.

2. The system of claim 1, wherein the instructions, when executed by the one or more processors, further cause the one or more processors to:
 display, by the billboard computing device, the concierge item of the first display format on the screen at a first position relative to the plurality of menu items; and
 display, by the billboard computing device, the concierge item of the second display format on the screen in a second position different from the first position.

3. The system of claim 1, wherein the instructions, when executed by the one or more processors, further cause the one or more processors to:
 display, by the billboard computing device, the concierge item of the second display format by animating the concierge item of the second display format to display at least one of a flipping movement or a rolling movement.

4. The system of claim 1, wherein the instructions, when executed by the one or more processors, further cause the one or more processors to:
 display a textual message within the second region of the screen, wherein the textual message provides guidance to interact with one or more of the plurality of menu items.

5. The system of claim 1, wherein the instructions, when executed by the one or more processors, further cause the one or more processors to:
 detect an occurrence of a triggering event; and
 responsive to detecting the occurrence of the triggering event:
  remove the message from the screen, and
  morph the concierge item from the second display format to the first display format.

6. The system of claim 1, wherein the instructions, when executed by the one or more processors, further cause the one or more processors to:
 select, based on information associated with a building where the screen is located, the first content item from the plurality of content items for display within the second region of the screen;
 determine an expiration of a predetermined period of time since displaying the first content item within the second region of the screen;
 select, responsive to determining the expiration, a second content item from the plurality of content items based on the information; and
 replace the first content item with the second content item to cause display of the second content item within the second region of the screen.

7. A method comprising:
 receiving, by a billboard computing device over a network and from a server, a content package generated based on data associated with an organization, the content package including a plurality of menu items, a concierge item, and a plurality of content items, wherein the plurality of content items includes a first content item;
 displaying, by the billboard computing device and based on the content package, the concierge item and the plurality of menu items within a first region of a screen of the billboard computing device;
 displaying, by the billboard computing device and based on the content package, the first content item of the plurality of content items within a second region of the screen;
 replacing, by the billboard computing device, the first content item displayed within the second region of the screen with a different content item of the plurality of content items while maintaining the concierge item and the plurality of menu items within the first region;
 detecting, by the billboard computing device, an interaction with a menu item of the plurality of menu items;
 morphing, by the billboard computing device based on detecting the interaction with the menu item, the concierge item from a first display format to a second display format different from the first display format based on the content package; and
 displaying, by the billboard computing device, a message within the second region of the screen based on the interaction with the menu item, the message being related to the menu item and unrelated to another menu item of the plurality of menu items;
 wherein the billboard computing device displays the concierge item of the first display format on the screen as a static object, wherein the billboard computing device displays the concierge item of the second display format on the screen as an animated object.

8. The method of claim 7, further comprising:
 selecting, by the billboard computing device responsive to detecting the interaction with the menu item, a trivia content item from the plurality of content items, the trivia content item comprising a first textual message indicative of a question and a second textual message indicative of a plurality of answer options.

9. The method of claim 7, wherein the different content item is a default content item.

10. The method of claim 7, further comprising:
 displaying, by the billboard computing device, the concierge item of the first display format on the screen at a first position relative to the plurality of menu items; and
 displaying, by the billboard computing device, the concierge item of the second display format on the screen in a second position different from the first position.

11. The method of claim 7, further comprising displaying, by the billboard computing device, the concierge item of the second display format by animating the concierge item of the second display format to display at least one of a flipping movement or a rolling movement.

12. The method of claim 7, further comprising displaying, by the billboard computing device, a textual message within the second region of the screen, wherein the textual message provides guidance to interact with one or more of the plurality of menu items.

13. The method of claim 7, further comprising:
 detecting, by the billboard computing device, an occurrence of a triggering event; and
 responsive to detecting the occurrence of the triggering event:
  removing, by the billboard computing device, the message from the screen, and
  morphing, by the billboard computing device, the concierge item from the second display format to the first display format.

14. The method of claim 7, further comprising:
 selecting, based on information associated with a building where the screen is located, the first content item from the plurality of content items for display within the second region of the screen.

15. The method of claim 14, further comprising:
 determining an expiration of a predetermined period of time since displaying the first content item within the second region of the screen.

16. The method of claim 15, further comprising:

selecting, responsive to determining the expiration, a second content item from the plurality of content items based on the information.

17. The method of claim 16, further comprising:

replacing the first content item with the second content item to cause display of the second content item within the second region of the screen.

18. A non-transitory computer-readable storage media comprising instructions that, when executed by one or more processors, cause the one or more processors to:

receive, over a network and from a server, a content package generated based on data associated with an organization, the content package including a plurality of menu items, a concierge item, and a plurality of content items, wherein the plurality of content items includes a first content item;

display, by a billboard computing device and based on the content package, the concierge item and the plurality of menu items within a first region of a screen of the billboard computing device;

display, by the billboard computing device and based on the content package, the first content item of the plurality of content items within a second region of the screen;

replace, by the billboard computing device, the first content item displayed within the second region of the screen with a different content item of the plurality of content items while maintaining the concierge item and the plurality of menu items within the first region;

detect an interaction with a menu item of the plurality of menu items;

morph, based on detecting the interaction with the menu item, the concierge item from a first display format to a second display format different from the first display format based on the content package; and display a message within the second region of the screen based on the interaction with the menu item, the message being related to the menu item and unrelated to another menu item of the plurality of menu items;

wherein the billboard computing device displays the concierge item of the first display format on the screen as a static object, wherein the billboard computing device displays the concierge item of the second display format on the screen as an animated object.

19. The non-transitory computer-readable storage media of claim 18, wherein the instructions, when executed by the one or more processors, further cause the one or more processors to:

display, by the billboard computing device, the concierge item of the first display format on the screen at a first position relative to the plurality of menu items; and display, by the billboard computing device, the concierge item of the second display format on the screen in a second position different from the first position.

20. The non-transitory computer-readable storage media of claim 18, wherein the instructions, when executed by the one or more processors, further cause the one or more processors to:

display, by the billboard computing device, the concierge item of the second display format by animating the concierge item of the second display format to display at least one of a flipping movement or a rolling movement.

* * * * *